United States Patent
Marupaduga

(10) Patent No.: US 10,972,160 B1
(45) Date of Patent: Apr. 6, 2021

(54) WIRELESS COMMUNICATIONS OVER MULTIPLE INPUT MULTIPLE OUTPUT (MIMO) LAYERS BASED ON BACKHAUL LINK QUALITY

(71) Applicant: Sprint Communications Company L.P., Overland Park, KS (US)

(72) Inventor: Sreekar Marupaduga, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 16/854,626

(22) Filed: Apr. 21, 2020

(51) Int. Cl.
| | |
|---|---|
| *H04B 7/04* | (2017.01) |
| *H04B 7/0456* | (2017.01) |
| *H04W 48/06* | (2009.01) |
| *H04W 80/04* | (2009.01) |
| *H04W 80/02* | (2009.01) |
| *H04W 92/04* | (2009.01) |

(52) U.S. Cl.
CPC .......... *H04B 7/0473* (2013.01); *H04W 48/06* (2013.01); *H04W 80/02* (2013.01); *H04W 80/04* (2013.01); *H04W 92/045* (2013.01)

(58) Field of Classification Search
CPC .. H04B 7/0473; H04W 48/06; H04W 92/045; H04W 80/02; H04W 80/04
See application file for complete search history.

(56) References Cited

U.S. PATENT DOCUMENTS

| | | | |
|---|---|---|---|
| 8,385,441 B2 | 2/2013 | Perets et al. | |
| 8,737,503 B2 | 5/2014 | Blankenship et al. | |
| 8,867,649 B2 | 10/2014 | Hum et al. | |
| 8,917,665 B2 * | 12/2014 | Seo | H04L 5/0051 370/328 |
| 9,219,583 B2 | 12/2015 | Xu et al. | |
| 9,236,985 B2 | 1/2016 | Chen et al. | |
| 9,270,427 B2 | 2/2016 | Blankenship et al. | |
| 9,655,125 B2 | 5/2017 | Gerstenberger et al. | |
| 2020/0008127 A1 * | 1/2020 | Ohtsuji | H04L 1/0005 |

OTHER PUBLICATIONS

3GPP R1-152778, "Support of UE-Network relays", Qualcomm Incorporated, May 2015 (Year: 2015).*

* cited by examiner

*Primary Examiner* — Nader Bolourchi

(57) ABSTRACT

A wireless access node serves wireless User Equipment (UEs) over Multiple Input Multiple Output (MIMO) layers. The wireless access node wirelessly exchanges user data with some of the wireless UEs. The wireless access node exchanges the user data over backhaul links. The wireless access node determines backhaul link quality. The wireless access node accepts the attachment of a new wireless UE. The wireless access node selects an amount of MIMO layers for the new wireless UE based on the backhaul link quality. The wireless access node wirelessly exchanges user data with the new wireless UE over the selected amount of the MIMO layers.

20 Claims, 13 Drawing Sheets

WIRELESS COMMUNICATIONS OVER MULTIPLE INPUT MULTIPLE OUTPUT (MIMO) LAYERS BASED ON BACKHAUL LINK QUALITY

TECHNICAL BACKGROUND

Wireless communication networks provide wireless data services to wireless user devices. Exemplary wireless data services include machine-control, internet-access, media-streaming, and social-networking. Exemplary wireless user devices comprise phones, computers, vehicles, robots, and sensors. The wireless communication networks have wireless access nodes that exchange wireless signals with the wireless user devices using wireless network protocols. Exemplary wireless network protocols include Institute of Electrical and Electronic Engineers (IEEE) 802.11 (WIFI), Long Term Evolution (LTE), Fifth Generation New Radio (5GNR), and Low-Power Wide Area Network (LP-WAN). In some examples, both LTE and 5GNR networks serve the same wireless user device at the same time with an integrated data service called dual-connectivity.

The wireless communication networks have deployed Multiple Input Multiple Output (MIMO) technology in the wireless access points. MIMO allows wireless user devices and wireless access nodes to transfer parallel data streams over the same frequency at the same time. MIMO uses precoding and spatial multiplexing to maintain isolation between these parallel data streams. For example, a wireless access node with 128 antenna elements may transmit parallel data streams over multiple MIMO layers to a wireless user device with eight antenna elements. The wireless access node might use four different sections of its 128 antenna elements to transmit four parallel signals to the wireless user device. The wireless user device uses its eight antenna elements receive and isolate the four parallel signals based on the precoding and spatial multiplexing.

The MIMO layers comprise independent radio links that carry different portions of the user data in parallel over shared time and frequency resources. The wireless user devices and the wireless access nodes exchange user data over the MIMO layers. The wireless access nodes exchange the user data with network elements over backhaul links. The network elements comprise network controllers and data gateways and are linked to external systems like the internet and content servers. The wireless access nodes determine the backhaul link quality—typically by measuring the data throughput on the uplink and/or the downlink.

Unfortunately, the use of multiple MIMO layers increases the load on the backhaul links. The congested backhaul links degrade the wireless data services to the wireless user devices. The wireless access nodes do not effectively and efficiently coordinate the use of multiple MIMO layers with the performance of their backhaul links.

Technical Overview

A wireless access node serves wireless User Equipment (UEs) over Multiple Input Multiple Output (MIMO) layers. The wireless access node wirelessly exchanges user data with some of the wireless UEs. The wireless access node exchanges the user data over backhaul links. The wireless access node determines backhaul link quality. The wireless access node accepts the attachment of a new wireless UE. The wireless access node selects an amount of MIMO layers for the new wireless UE based on the backhaul link quality. The wireless access node wirelessly exchanges user data with the new wireless UE over the selected amount of the MIMO layers.

DETAILED DESCRIPTION

Figure 1:
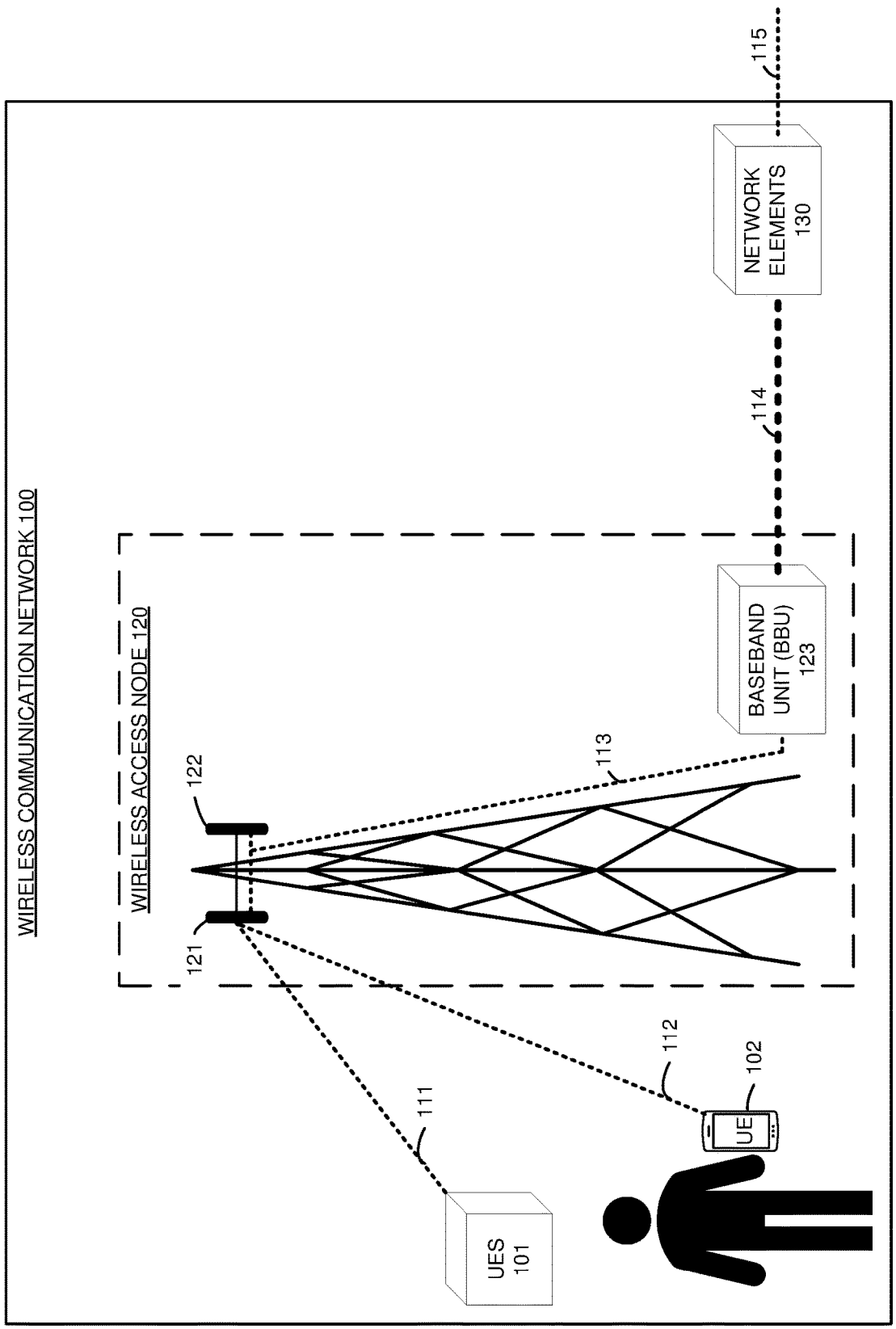
FIG. 1 illustrates a wireless access node to serve wireless User Equipment (UE) over Multiple Input Multiple Output (MIMO) layers based on backhaul link quality.

FIG. 1 illustrates wireless access node 120 to serve wireless User Equipment (UE) 102 over Multiple Input Multiple Output (MIMO) layers based on backhaul link quality. Wireless communication network 100 comprises wireless UEs 101-102, wireless access node 120, and network elements 130. Although UE 102 is depicted as a smartphone operated by a human, UE 102 might instead comprise a computer, robot, vehicle, or some other data appliance with wireless communication circuitry that may or may not be operated by a human. Wireless access node 120 comprises radios 121-122 and Baseband Unit (BBU) 123. Radios 121-122 are mounted on a tower, but radios 121-122 may use other mounting structures or no mounting structure at all.

Various examples of network operation and configuration are described herein. In one example, radio 121 wirelessly exchanges user data with UEs 101 over wireless links 111. Radio 121 exchanges the user data with BBU 123 over BBU links 113. BBU 123 exchanges the user data with network elements 130 over backhaul links 114. Network elements 130 exchange the user data with external systems over external links 115. BBU 123 determines backhaul link quality for backhaul links 114 by measuring throughput, latency, and/or some other quality metric.

Subsequently, UE 102 wirelessly attaches to radio 121 over wireless link 112. In response to the wireless attachment, BBU 123 selects a number of MIMO layers for UE 102 based on the backhaul link quality. BBU 123 directs radio 121 to wirelessly exchange user data with UE 102 over wireless link 112 using the selected amount of MIMO layers. Radio 121 wirelessly exchanges user data with UE 102 over wireless link 112 using the selected amount of the MIMO layers. Wireless access node 120 increases the MIMO layers as the backhaul quality increases, and wireless access node 120 decreases the MIMO layers as the backhaul quality decreases.

Wireless links 111-112 use over-the-air air electromagnetic frequencies in the low-band, mid-band, high-band, or some other portion of the electromagnetic spectrum. Wireless links 111-112 use protocols like Fifth Generation New Radio (5GNR), Long Term Evolution (LTE), Institute of Electrical and Electronic Engineers (IEEE) 802.11 (WIFI), Low-Power Wide Area Network (LP-WAN), and/or some other format that uses MIMO layers. Links 113-115 use metal, glass, air, or some other media. Links 113-115 use IEEE 802.3 (Ethernet), Time Division Multiplex (TDM), Data Over Cable System Interface Specification (DOCSIS), Internet Protocol (IP), 5GC, 5GNR, LTE, WIFI, virtual switching, inter-processor communication, bus interfaces, and/or some other data communication protocols. Links 111-115 may comprise intermediate network elements like relays, routers, and controllers.

UEs 101-102 and radios 121-122 comprise antennas, amplifiers, filters, modulation, analog/digital interfaces, microprocessors, software, memories, transceivers, bus circuitry, and the like. BBU 123 and network elements 130 comprise microprocessors, memories, software, transceivers, bus circuitry, and the like. The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, user applications, radio applications, and network applications. The microprocessors retrieve the software from the memories and execute the software to drive the operation of wireless communication network 100 as described herein.

Wireless access node 120 comprises a 5GNR gNodeB, LTE eNodeB, WIFI hotspot, Evolved Universal Terrestrial Radio Access Network Dual Connectivity (EN-DC) node, and/or some other wireless network apparatus. Network elements 130 comprise a User Plane Function (UPF), Access and Mobility Management Function (AMF), Serving Gateway (SGW), Mobility Management Entity (MME), System Architecture Evolution Gateway (SAE GW), and/or some other network apparatus.

Figure 2:
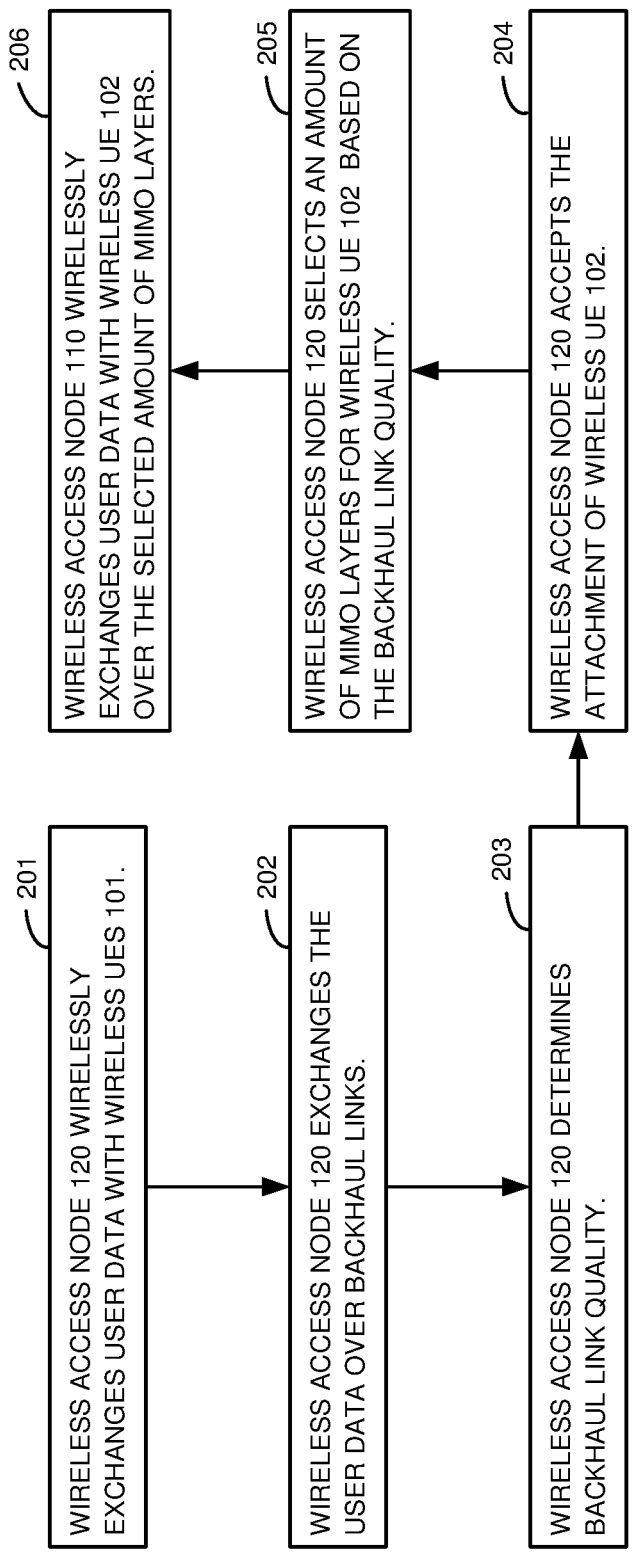
FIG. 2 illustrates an exemplary operation of the wireless access node to serve the wireless UE over the MIMO layers based on the backhaul link quality.

FIG. 2 illustrates an exemplary operation of wireless access node 120 to serve wireless UE 102 over MIMO layers based on backhaul link quality. Wireless access node 120 wirelessly exchanges user data with UEs 101 (201). Wireless access node 120 exchanges the user data with network elements 130 over backhaul links 114 (202). BBU 123 determines backhaul link quality for backhaul links 114 by measuring throughput, latency, and/or some other quality metric (203). Wireless access node 120 accepts the wireless attachment of UE 102 (204). Wireless access node 120 selects an amount of MIMO layers for UE 102 based on the backhaul link quality (205). For example, wireless access node 120 may host a data structure that increases the selected amount of the MIMO layers as the backhaul quality increases and that decreases the selected amount of the MIMO layers as the backhaul quality decreases. Wireless access node 120 wirelessly exchanges user data with UE 102 using the selected amount of the MIMO layers (206).

Figure 3:
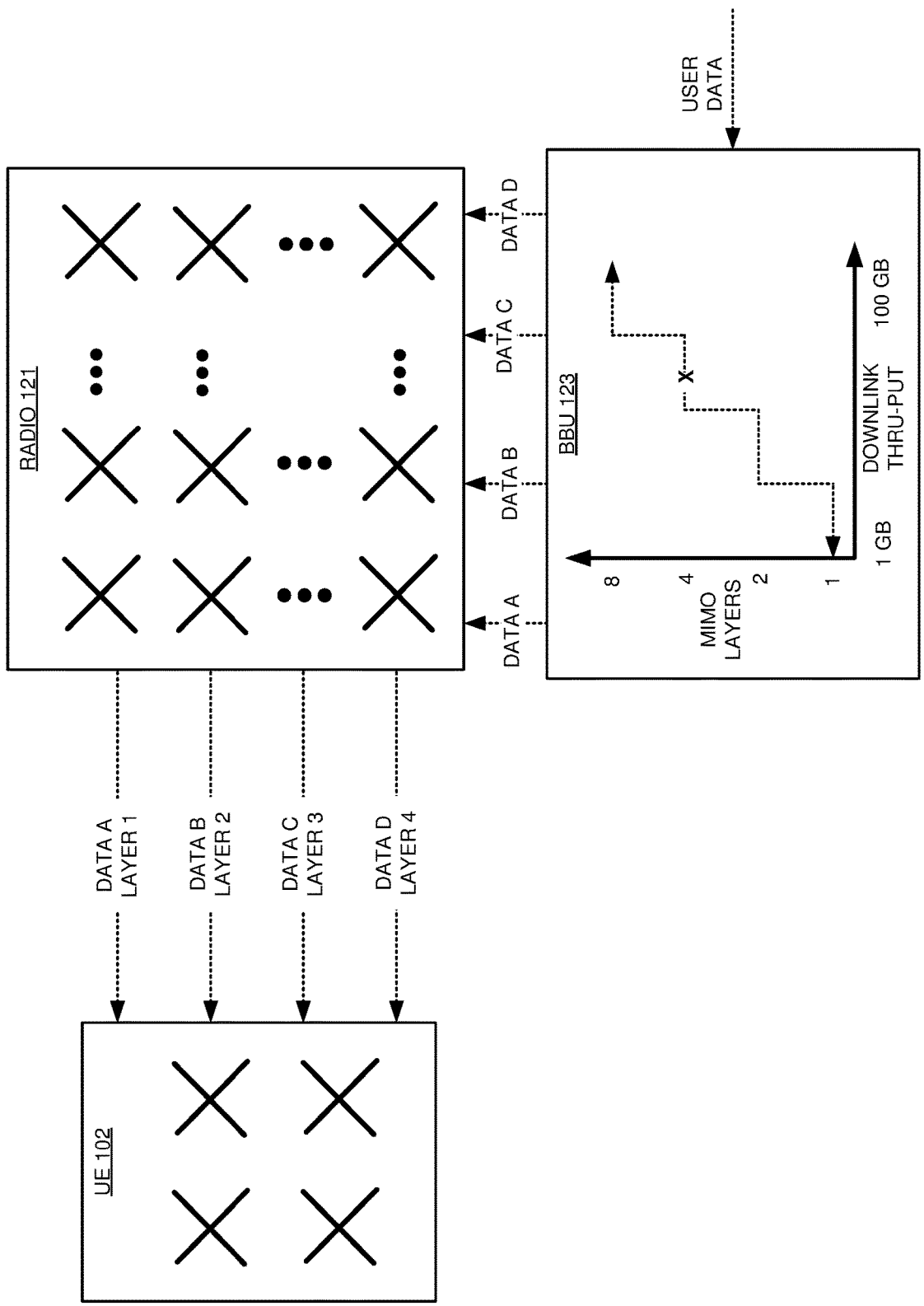
FIG. 3 illustrates an exemplary operation of the wireless access node to serve the wireless UE over the MIMO layers based on the backhaul link quality.

FIG. 3 illustrates an exemplary operation of wireless access node 120 to serve wireless UE 102 over MIMO layers based on backhaul link quality. Radio 121 is depicted with an antenna array that has N orthogonal antenna elements where N might be 16, 32, 64, 128, 256, and so on. UE 102 is depicted with an antenna array that has 8 orthogonal antenna elements, although the number could vary in other examples. The MIMO layers comprise independent radio links that carry different portions of the user data in parallel over shared time and frequency resources. For example, multiple different groups of antenna elements in radio 121 may transmit different data streams in parallel, and the antenna elements in UE 102 differentiate and isolate the different data streams base on precoding and spatial multiplexing.

BBU 123 hosts a data structure that implements the graph shown on FIG. 3. The vertical axis of the graph indicates the number of MIMO layers: 1, 2, 4, or 8. The horizontal axis indicates the average downlink throughput from 1 gigabit per second (GB) to 100 gigabits per second. These numbers are illustrative and other values could be used. In this example as indicated by the X mark on the graph, BBU 123 selects four MIMO layers for UE 102 based on the average downlink throughput of around 60 gigabits per second.

BBU 123 receives user data from the downlink and allocates the user data into four portions (A-D) responsive to the selection of the four MIMO layers. BBU 123 transfers data A, B, C, and D to radio 121 and directs radio 121 to use the four MIMO layers for the respective data portions. Radio 121 wirelessly transfers data A to UE 102 over MIMO layer 1. Radio 121 wirelessly transfers data B to UE 102 over MIMO layer 2. Radio 121 wirelessly transfers data C to UE 102 over MIMO layer 3. Radio 121 wirelessly transfers data D to UE 102 over MIMO layer 4. The four MIMO layers all use the same time and frequency resources like the same resource blocks. UE 102, radio 121, and BBU 123 use precoding and spatial multiplexing to maintain isolation between the four MIMO layers.

Advantageously, BBU 123 effectively and efficiently coordinates the use of multiple MIMO layers with the performance of the backhaul links. BBU 123 uses the multiple MIMO layers to improve the wireless data service for the end-users, but the multiple MIMO layers also increase the load on the backhaul links. BBU 123 controls the amount of MIMO layers based on backhaul quality to mitigate service degradation for the end-users that is caused by backhaul congestion.

Figure 4:
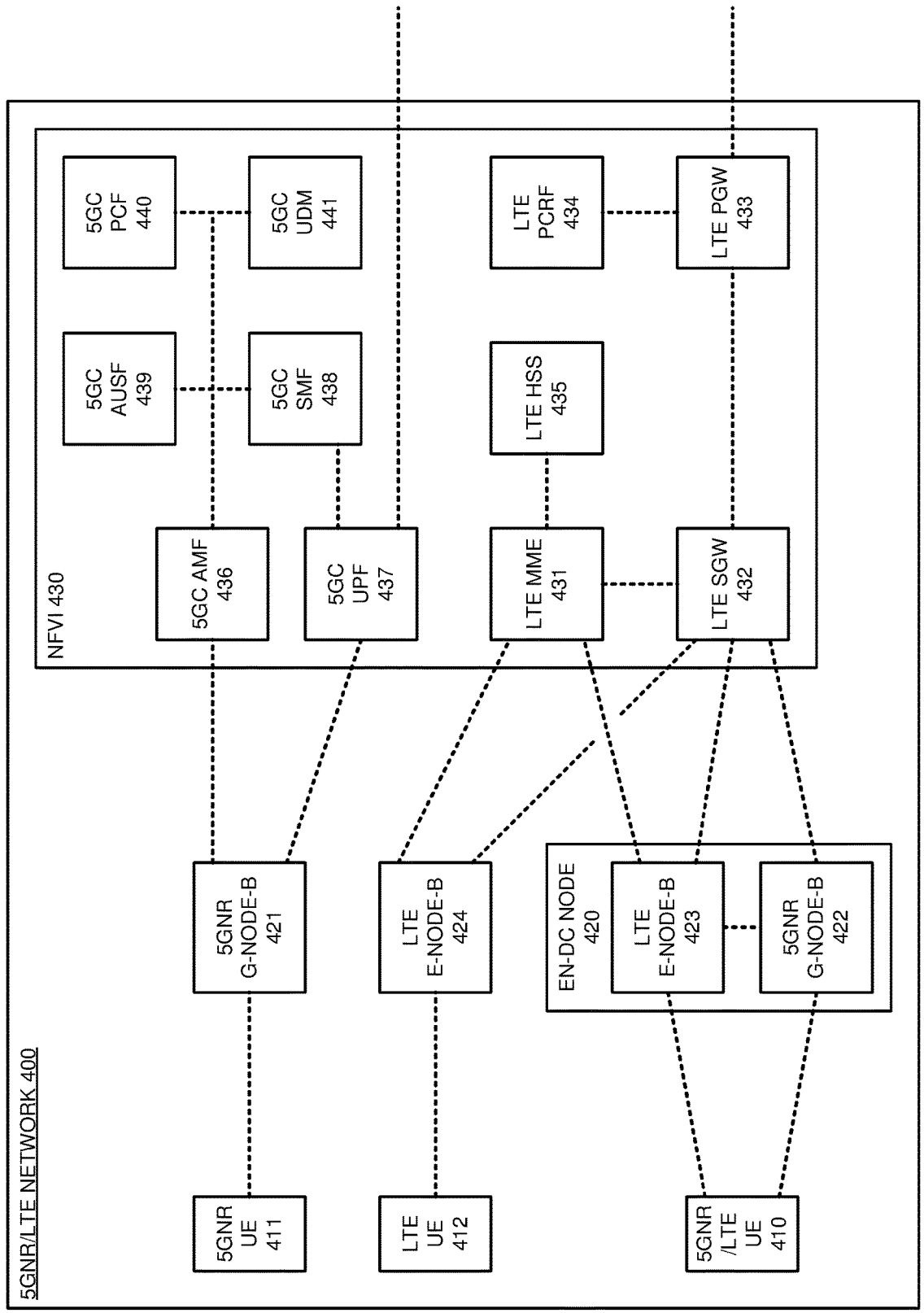
FIG. 4 illustrates Fifth Generation New Radio (5GNR) Long Term Evolution (LTE) network to serve UEs over MIMO layers based on backhaul link quality.

FIG. 4 illustrates Fifth Generation New Radio (5GNR) Long Term Evolution (LTE) network 400 to serve UEs 410-412 over MIMO layers based on backhaul link quality. 5GNR/LTE network 400 is an example of wireless communication network 100, although network 100 may differ. 5GNR/LTE network 400 comprises 5GNR/LTE UE 410, 5GNR UE 411, LTE UE 412, Evolved Universal Terrestrial Radio Access Network Dual Connectivity (EN-DC) node 420, 5GNR gNodeB 421, LTE eNodeB 424, and Network Function Virtualization Infrastructure (NFVI) 430. EN-DC node 420 comprises 5GNR gNodeB 422 and LTE eNodeB 423. NFVI 430 comprises LTE Mobility Management Entity (MME) 431, LTE Serving Gateway (SGW) 432, LTE Packet Data Network Gateway (PGW) 433, LTE Policy Charging Rules Function (PCRF) 434, LTE Home Subscriber System (HSS) 435, Fifth Generation Core (5GC) Access and Mobility Management Function (AMF) 436, 5GC User Plane Function (UPF) 437, 5GC Session Management Function (SMF) 438, 5GC Authentication and Security Function (AUSF) 439, Policy Control Function (PCF 440), and 5GC Unified Data Manager (UDM) 441.

LTE eNodeB 423 wirelessly exchange user data with various UEs that are not shown for clarity. LTE eNodeB 423 exchanges the user data with LTE SGW 432 over backhaul links. LTE eNodeB 423 determines the average downlink LTE throughput over the backhaul links for these UEs. 5GNR gNodeB 422 wirelessly exchanges user data with various UEs that are not shown for clarity. 5GNR gNodeB 422 exchanges the user data with LTE SGW 422 over backhaul links. 5GNR gNodeB 422 determines the average 5GNR downlink throughput over the backhaul links for these UEs.

Contemporaneously, 5GNR/LTE UE 410 attaches to LTE eNodeB 423 in EN-DC node 420, and UE 410 indicates its 5GNR capability. LTE eNodeB 423 requests data service for UE 410 from LTE MME 431 over S1-MME signaling and indicates the 5GNR capability. LTE MME 431 interacts with HSS 435 to authenticate and authorize LTE/5GNR UE 410 for wireless data services that are represented by Access Point Names (APNs). The data services for 5GNR/LTE UE 410 include 5GNR service. LTE MME 431 transfers the APNs for UE 410 to LTE PGW 433 over LTE SGW 432. LTE PGW 433 interacts with LTE PCRF 434 to select Quality-of-Service Class Identifiers (QCIs) and network addresses for LTE/5GNR UE 410 based on the APNs. LTE PGW 433 transfers the APNs, QCIs, and network addresses for UE 410 to LTE MME 431 over LTE SGW 432. MME 431 transfers the APNs, QCIs, and network address for UE 410 to LTE eNodeB 423. LTE eNode B transfers the selected APNs, QCIs, and network addresses to UE 410.

LTE eNodeB 423 selects a number of downlink LTE MIMO layers for UE 410 based on the contemporaneous downlink LTE backhaul throughput. LTE eNodeB 423 signals the selected number of downlink LTE MIMO layers to 5GNR/LTE UE 410 and to LTE MME 431. LTE PGW 433 exchanges user data for UE 410 with external systems. LTE PGW 433 exchanges the user data with SGW 432 which exchanges the user data with LTE eNodeB 423. LTE eNodeB 423 exchanges the user data with UE 410. In particular, LTE eNodeB 423 transfers downlink user data to UE 410 over the selected number of downlink LTE MIMO layers. Over time, LTE eNodeB 423 increases the number of downlink LTE MIMO layers for new UEs as the downlink backhaul throughput from LTE SGW 432 to eNodeB 423 increases. Over time, LTE eNodeB 423 decreases the number of downlink LTE MIMO layers for new UEs as the downlink backhaul throughput from LTE SGW 432 to eNodeB 423 decreases.

In response to 5GNR service authorization, LTE eNodeB 423 directs UE 410 to attach to 5GNR gNodeB 422 in EN-DC node 420. UE 410 responsively attaches to 5GNR gNodeB 422. 5GNR gNodeB 422 selects a number of downlink 5GNR MIMO layers for UE 410 based on the contemporaneous downlink 5GNR backhaul throughput. 5GNR gNodeB 422 signals the selected number of downlink 5GNR MIMO layers to 5GNR/LTE UE 410 and LTE eNodeB 423. LTE eNodeB 423 signals number of 5GNR layers for UE 410 to LTE MME 431. LTE MME 431 directs LTE SGW 432 to serve UE 410 over 5GNR gNodeB 422. In response, LTE SGW 432 exchanges user data for UE 410 with 5GNR gNodeB 422 (in addition to LTE eNodeB 423). 5GNR gNodeB 422 exchanges the user data with UE 410. In particular, 5GNR gNodeB 422 transfers the downlink user data to UE 410 over the selected number of downlink 5GNR MIMO layers. Over time, 5GNR gNodeB 422 increases the number of downlink 5GNR MIMO layers for new UEs as the downlink backhaul throughput from LTE SGW 432 to 5GNR gNodeB 422 increases. Over time, 5GNR gNodeB 422 decreases the number of downlink 5GNR MIMO layers for new UEs as the downlink backhaul throughput from LTE SGW 432 to 5GNR gNodeB 422 decreases.

5GNR gNodeB 421 wirelessly exchanges user data with various UEs that are not shown for clarity. 5GNR gNodeB 421 exchanges the user data with 5GC UPF 437 over backhaul links. 5GNR gNodeB 421 determines the average downlink 5GNR throughput over the backhaul links for these UEs. Contemporaneously, 5GNR UE 411 attaches to 5GNR gNodeB 421. 5GNR gNodeB 421 requests data service for UE 411 from 5GC AMF 436 over N2 signaling. 5GC AMF 436 interacts with 5GC SMF 438, 5GC AUSF 439, 5GC UDM 441, and 5GC PCF 440 to authenticate and authorize 5GNR UE 411 for 5GNR data services. 5GC AMF 436 transfers quality-of-service metrics and network addressing for UE 411 to 5GNR gNodeB 421 and 5GC SMF 438. 5GC SMF 438 directs 5GC UPF 437 to serve UE 411 per the quality-of-service metrics and network addressing. 5GNR gNodeB 421 transfers the quality-of-service metrics and network addressing to UE 411. 5GNR gNodeB 421 selects a number of downlink 5GNR MIMO layers for UE 411 based on the contemporaneous downlink 5GNR backhaul throughput from 5GC UPF 437. 5GNR gNodeB 421 signals the selected number of downlink 5GNR MIMO layers to 5GNR UE 411 and possibly to 5GC AMF 436.

5GC UPF 437 exchanges user data for UE 410 with external systems. 5GC UPF 437 exchanges the user data with 5GNR gNodeB 421. 5GNR gNodeB 421 exchanges the user data with UE 411. In particular, 5GNR gNodeB 421 transfers the downlink user data over the selected number of downlink 5GNR MIMO layers. Over time, 5GNR gNodeB 421 increases the number of downlink 5GNR MIMO layers for new UEs as the downlink backhaul throughput from 5GC UPF 437 increases. Over time, 5GNR gNodeB 421 decreases the number of downlink 5GNR MIMO layers for new UEs as the downlink backhaul throughput from 5GC UPF 437 decreases.

LTE eNodeB 424 wirelessly exchange user data with various UEs that are not shown for clarity. LTE eNodeB 424 exchanges the user data with LTE SGW 422 over backhaul links. LTE eNodeB 424 determines the average downlink throughput over the backhaul links for these UEs. Contemporaneously, LTE UE 412 attaches to LTE eNodeB 424. LTE eNodeB 424 requests data service for UE 412 from LTE MME 431 in S1-MME signaling LTE MME 431 interacts with HSS 435 to authenticate and authorize UE 412 for wireless data services that are represented by APNs. LTE MME 431 transfers the APNs for UE 412 to LTE PGW 433 over LTE SGW 432. LTE PGW 433 interacts with LTE PCRF 434 to select QCIs and network addresses for LTE UE 412 based on the APNs. LTE PGW 433 transfers the APNs, QCIs, and addresses to LTE MME 431 over LTE SGW 432. MME 431 transfers the APNs, QCIs, and network address for UE 412 to LTE eNodeB 424. LTE eNodeB 424 transfers the APNs, QCIs, and network address to UE 412.

LTE eNodeB 424 selects a number of downlink LTE MIMO layers for UE 412 based on the contemporaneous downlink backhaul throughput from SGW 432. LTE eNodeB 424 signals the selected number of downlink LTE MIMO layers to LTE UE 412 and to LTE MME 431. LTE PGW 433 exchanges user data for UE 412 with external systems. LTE PGW 433 exchanges the user data with SGW 432 which exchanges the user data with LTE eNodeB 424. LTE eNodeB 424 exchanges the user data with UE 412. In particular, LTE eNodeB 424 transfers the downlink user data over the selected number of downlink LTE MIMO layers. Over time, LTE eNodeB 424 increases the number of downlink LTE MIMO layers for new UEs as the downlink backhaul throughput from LTE SGW 432 increases. Over time, LTE eNodeB 424 decreases the number of downlink LTE MIMO layers for new UEs as the downlink backhaul throughput from LTE SGW 432 decreases.

Figure 5:
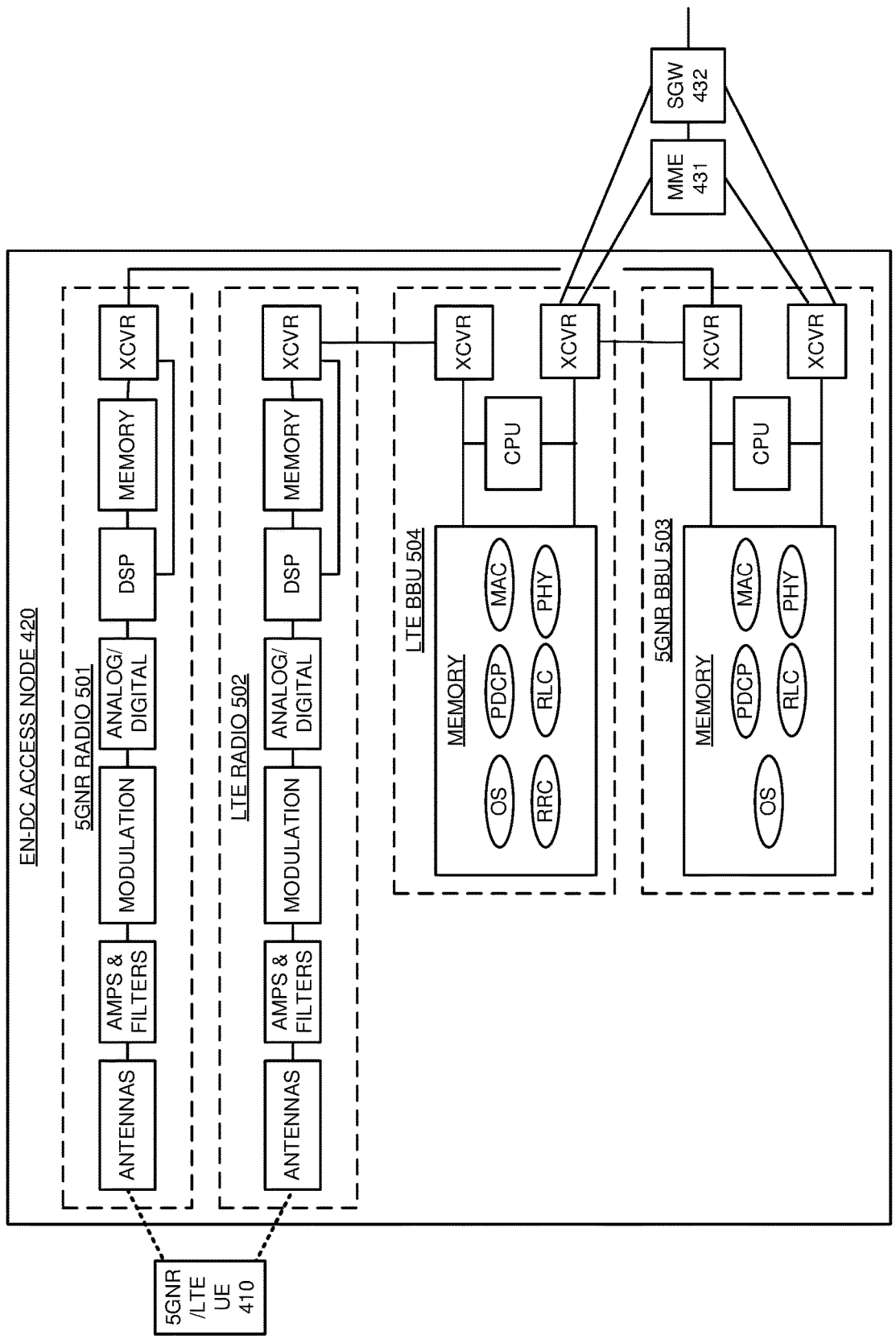
FIG. 5 illustrates an Evolved Universal Terrestrial Radio Access Network Dual Connectivity (EN-DC) access node to serve UEs over MIMO layers based on backhaul link quality.

FIG. 5 illustrates Evolved Universal Terrestrial Radio Access Network Dual Connectivity (EN-DC) access node 420 to serve 5GNR/LTE UE 410 over a selected number of LTE and 5GNR MIMO layers based on backhaul link quality. EN-DC access node 420 is an example of wireless access node 120, although access node 120 may differ. EN-DC access node 420 comprises 5GNR radio 501, LTE radio 502, 5GNR Baseband Unit (BBU) 503, and LTE BBU 504. Radios 501-502 comprise antennas, amplifiers, filters, modulation, analog-to-digital interfaces, DSP, memory, and transceivers (XCVR) that are coupled over bus circuitry. BBUs 503-504 comprise memory, CPU, and transceivers that are coupled over bus circuitry. The memories in BBUs 503-504 store operating systems (OS) and network applications like Physical Layer (PHY), Media Access Control (MAC), Radio Link Control (RLC), Packet Data Convergence Protocol (PDCP), and Radio Resource Control (RRC). The CPU in BBUs 503-504 execute the operating systems, PHYs, MACs, RLCs, PDCPs, and RRCs to exchange network signaling with UE 410 and MME 431 and to exchange user data between UE 410 and SGW 432.

5GNR/LTE UE 410 is wirelessly coupled to the antennas in 5GNR radio 501 over a 5GNR link. The transceiver in 5GNR radio 501 is coupled to a transceiver in 5GNR BBU 503 over Common Public Radio Interface (CPRI) links. A transceiver in 5GNR BBU 503 is coupled to MME 431 and SGW 432 over backhaul links. 5GNR/LTE UE 410 is wirelessly coupled to the antennas in LTE radio 502 over an LTE link. The transceiver in LTE radio 502 is coupled to a transceiver in LTE BBU 504 over CPRI links. A transceiver in LTE BBU 504 is coupled to MME 431 and to SGW 432 over backhaul links. A transceiver in 5GNR BBU 503 is coupled to a transceiver in LTE BBU 504 over X2 links.

In LTE radio 502, the antennas receive wireless LTE signals from 5GNR/LTE UE 410 that transport Uplink (UL) LTE signaling and UL LTE data. The antennas transfer corresponding electrical UL signals through duplexers to the amplifiers. The amplifiers boost the received UL signals for filters which attenuate unwanted energy. Demodulators down-convert the UL signals from their carrier frequency. The analog/digital interfaces convert the analog UL signals into digital UL signals for the DSP. The DSP recovers UL LTE symbols from the UL digital signals. The CPUs execute the network applications to process the UL LTE symbols and recover the UL LTE signaling and the UL LTE data. The RRC processes the UL LTE signaling and Downlink (DL) S1-MME signaling to generate new UL S1-MME signaling and new DL LTE signaling. The RRC transfers the new UL S1-MME signaling to MME 431 over the backhaul links. The PDCP transfers the UL LTE data to LTE SGW 432 over the backhaul links.

In LTE BBU 504, the LTE RRC receives the DL S1-MME signaling from MME 431, and the PDCP receives DL LTE data from SGW 432. The LTE network applications process the new DL LTE signaling and the DL LTE data to generate corresponding DL LTE symbols that carry the DL LTE signaling and DL LTE data. In LTE radio 502, the DSP processes the DL LTE symbols to generate corresponding digital signals for the analog-to-digital interfaces. The analog-to-digital interfaces convert the digital DL signals into analog DL signals for modulation. Modulation up-converts the DL signals to their carrier frequency. The amplifiers boost the modulated DL signals for the filters which attenuate unwanted out-of-band energy. The filters transfer the filtered DL signals through duplexers to the antennas. The electrical DL signals drive the antennas to emit corresponding wireless LTE signals that transport the DL LTE signaling and DL LTE data to UE 410.

In 5GNR radio 501, the antennas receive wireless 5GNR signals from 5GNR/LTE UE 410 that transport Uplink (UL) 5GNR signaling and UL 5GNR data. The antennas transfer corresponding electrical UL signals through duplexers to the amplifiers. The amplifiers boost the received UL signals for filters which attenuate unwanted energy. Demodulators down-convert the UL signals from their carrier frequency. The analog/digital interfaces convert the analog UL signals into digital UL signals for the DSP. The DSP recovers UL 5GNR symbols from the UL digital signals. The CPUs execute the network applications to process the UL 5GNR symbols and recover the UL 5GNR signaling and the UL 5GNR data. The 5GNR PDCP processes the UL 5GNR signaling and DL X2 signaling from the LTE RRC in LTE BBU 504 to generate new UL X2 signaling and new DL 5GNR signaling. The 5GNR PDCP transfers the new UL X2 signaling to the LTE RRC in BBU 504. The 5GNR PDCP transfers the UL 5GNR data to SGW 432 over backhaul links.

In 5GNR BBU 503, the 5GNR PDCP receives the DL X2 signaling from the LTE RRC in BBU 504. The 5GNR PDCP also receives DL 5GNR data from SGW 432. The 5GNR network applications process the new DL 5GNR signaling and the DL 5GNR data to generate corresponding DL 5GNR symbols that carry the DL 5GNR signaling and DL 5GNR data. In 5GNR radio 501, the DSP processes the DL 5GNR symbols to generate corresponding digital signals for the analog-to-digital interfaces. The analog-to-digital interfaces convert the digital DL signals into analog DL signals for modulation. Modulation up-converts the DL signals to their carrier frequency. The amplifiers boost the modulated DL signals for the filters which attenuate unwanted out-of-band energy. The filters transfer the filtered DL signals through duplexers to the antennas. The electrical DL signals drive the antennas to emit corresponding wireless 5GNR signals that transport the DL 5GNR signaling and DL 5GNR data to UE 410.

RRC functions comprise authentication, security, handover control, status reporting, Quality-of-Service (QoS), network broadcasts and pages, and network selection. PDCP functions comprise LTE/5GNR allocations, security ciphering, header compression and decompression, sequence numbering and re-sequencing, de-duplication. RLC functions comprise Automatic Repeat Request (ARQ), sequence numbering and resequencing, segmentation and resegmentation. MAC functions comprise buffer status, power control, channel quality, Hybrid Automatic Repeat Request (HARQ), user identification, random access, user scheduling, and QoS. PHY functions comprise packet formation/deformation, windowing/de-windowing, guard-insertion/guard-deletion, parsing/de-parsing, control insertion/removal, interleaving/de-interleaving, Forward Error Correction (FEC) encoding/decoding, rate matching/de-matching, scrambling/descrambling, modulation mapping/de-mapping, channel estimation/equalization, Fast Fourier Transforms (FFTs)/Inverse FFTs (IFFTs), channel coding/decoding, layer mapping/de-mapping, precoding, Discrete Fourier Transforms (DFTs)/Inverse DFTs (IDFTs), and Resource Element (RE) mapping/de-mapping.

To control the amount of DL LTE MIMO layers for UE 410, LTE radio 502 first exchanges LTE data with various UEs that are not shown for clarity. LTE radio 502 exchanges the LTE data with LTE BBU 504 over the CPRI links. LTE BBU 504 exchanges the LTE data with LTE SGW 432 over the backhaul links. The LTE PDCP in LTE BBU 504 determines the average LTE DL data throughput over the backhaul links for these UEs. The LTE PDCP indicates the average LTE DL data throughput to the LTE MAC. Contemporaneously, 5GNR/LTE UE 410 attaches to LTE radio 502. The LTE MAC in LTE BBU 504 selects a number of DL LTE MIMO layers for UE 410 based on the average LTE DL data throughput from SGW 432. The LTE MAC signals the selected number of downlink LTE MIMO layers to the LTE PHY and RRC in BBU 504, the LTE MAC in UE 410, and the 5GNR MAC in BBU 503. The LTE RRC indicates the selected number of DL LTE MIMO layers to MME 431. The LTE RRC receives APNs, QCIs, and network addresses for UE 410 from MME 431. The LTE RRC transfers the APNs, QCIs, and network addresses to the LTE RRC in UE 410. SGW 432 exchanges LTE data with the LTE PDCP in LTE BBU 504 per the APNs, QCIs, and network addresses. The LTE PDCP exchanges the user data with the LTE PDCP in UE 410 over the RLCs, MACs, and PHYs per the APNs, QCIs, and network addresses. The LTE PHYs pre-code and map the DL LTE data to the selected DL MIMO layers responsive to LTE MAC control.

5GNR radio 501 exchanges 5GNR data with various UEs that are not shown for clarity. 5GNR radio 501 exchanges the 5GNR data with 5GNR BBU 503 over the CPRI links. 5GNR BBU 503 exchanges the 5GNR data with SGW 432 over backhaul links. The 5GNR PDCP in 5GNR BBU 503 determines the average 5GNR DL data throughput over the backhaul links for these UEs. The 5GNR PDCP indicates the average 5GNR DL data throughput to the 5GNR MAC. Based on the 5GNR capability reported by UE 410, the LTE RRC in BBU 504 directs the 5GNR PDCP in UE 410 to attach UE 410 to 5GNR radio 501. 5GNR/LTE UE 410 wirelessly attaches to 5GNR radio 501. The 5GNR MAC in 5GNR BBU 503 selects a number of DL 5GNR MIMO layers for UE 410 based on the average 5GNR DL data throughput from SGW 432. The 5GNR MAC signals the selected number of DL 5GNR MIMO layers to the 5GNR MAC in UE 410 and to the LTE RRC and PHY in BBU 504. The LTE RRC transfers the selected number of DL 5GNR MIMO layers to MME 431. MME 431 directs SGW 432 to serve UE 410 over 5GNR BBU 503. SGW 432 exchanges 5GNR data with the 5GNR PDCP in 5GNR BBU 503. The 5GNR PDCP in BBU 503 exchanges the 5GNR data with the 5GNR PDCP in UE 410 over the RLCs, MACs, and PHYs. The 5GNR PHYs pre-code and map the DL 5GNR data to the selected DL MIMO layers responsive to 5GNR MAC control.

In alternative examples, the number of LTE MIMO layers might be controlled based on 5GNR backhaul quality. Likewise, the number of 5GNR MIMO layers might be controlled based on the LTE backhaul quality. In some examples, the LTE MAC first reduces the LTE MIMO layers for its UEs and signals the 5GNR MAC when the LTE MIMO layer reduction is complete. In response to the LTE MAC signaling after the LTE MIMO layer reduction, the 5GNR MAC reduces the 5GNR MIMO layers for its UEs and signals the LTE MAC of the reductions. Note that the number of UL MIMO layers may be controlled in a similar manner to the number of DL MIMO layers as described herein. The number of UL MIMO layers could be based on the UL throughput, DL throughput, or some other backhaul quality metric.

Figure 6:
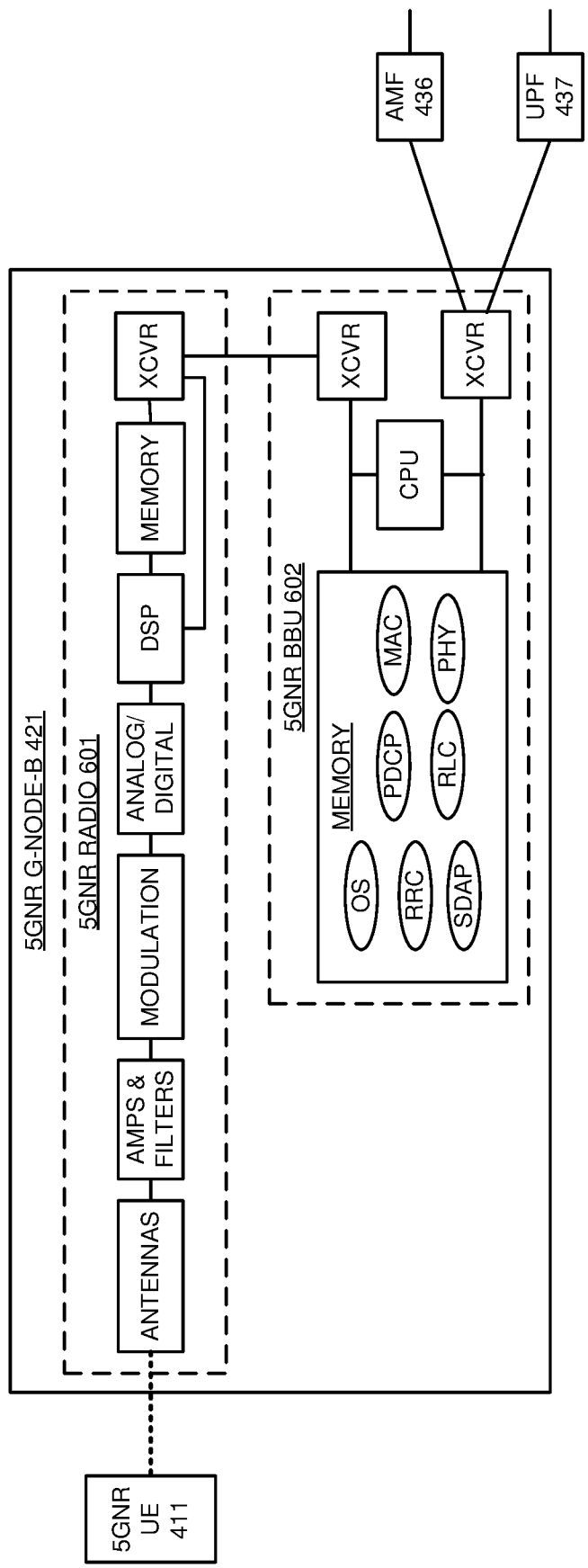
FIG. 6 illustrates a 5GNR gNodeB to serve UEs over the MIMO layers based on the backhaul link quality.

FIG. 6 illustrates 5GNR gNodeB 421 to serve 5GNR UE 411 over 5GNR MIMO layers based on backhaul link quality. 5GNR gNodeB 421 is an example of wireless access node 120, although access node 120 may differ. 5GNR gNodeB 421 comprises 5GNR radio 601 and 5GNR BBU 602. 5GNR radio 601 comprises antennas, amplifiers, filters, modulation, analog-to-digital interfaces, DSP, memory, and transceivers that are coupled over bus circuitry. BBU 602 comprises memory, CPU, and transceivers that are coupled over bus circuitry. The memory in BBU 602 stores operating systems and network applications like PHY, MAC, RLC, PDCP, RRC, and Service Data Adaptation Protocol (SDAP). The CPU in BBU 602 executes the operating systems, PHYs, MACs, RLCs, PDCPs, SDAPs, and RRCs to exchange network signaling with 5GNR UE 411 and AMF 436 and to exchange user data between 5GNR UE 411 and UPF 437.

5GNR UE 411 is wirelessly coupled to the antennas in 5GNR radio 601 over a 5GNR link. The transceiver in 5GNR radio 601 is coupled to a transceiver in 5GNR BBU 602 over CPRI links. A transceiver in 5GNR BBU 602 is coupled to AMF 436 and UPF 437 over backhaul links. In 5GNR radio 601, the antennas receive wireless 5GNR signals from 5GNR UE 411 that transport UL 5GNR signaling and UL 5GNR data. The antennas transfer corresponding electrical UL signals through duplexers to the amplifiers. The amplifiers boost the received UL signals for filters which attenuate unwanted energy. Demodulators down-convert the UL signals from their carrier frequency. The analog/digital interfaces convert the analog UL signals into digital UL signals for the DSP. The DSP recovers UL 5GNR symbols from the UL digital signals. The CPUs execute the network applications to process the UL 5GNR symbols and recover the UL 5GNR signaling and the UL 5GNR data. The 5GNR RRC processes the UL 5GNR signaling and DL N2 signaling from AMF 436 to generate new UL N2 signaling and new DL 5GNR signaling. The 5GNR RRC transfers the new UL N2 signaling to AMF 436. The 5GNR SDAP transfers the UL 5GNR data to UPF 437 over backhaul links.

In 5GNR BBU 602, the 5GNR RRC receives the DL N2 signaling from AMF 436. The 5GNR SDAP receives DL 5GNR data from UPF 437. The 5GNR network applications process the new DL 5GNR signaling and the DL 5GNR data to generate corresponding DL 5GNR symbols that carry the DL 5GNR signaling and DL 5GNR data. In 5GNR radio 601, the DSP processes the DL 5GNR symbols to generate corresponding digital signals for the analog-to-digital interfaces. The analog-to-digital interfaces convert the digital DL signals into analog DL signals for modulation. Modulation up-converts the DL signals to their carrier frequency. The amplifiers boost the modulated DL signals for the filters which attenuate unwanted out-of-band energy. The filters transfer the filtered DL signals through duplexers to the antennas. The electrical DL signals drive the antennas to emit corresponding wireless 5GNR signals that transport the DL 5GNR signaling and DL 5GNR data to 5GNR UE 411.

RRC functions comprise authentication, security, handover control, status reporting, QoS, network broadcasts and pages, and network selection. SDAP functions comprise QoS marking and flow control. PDCP functions comprise LTE/5GNR allocations, security ciphering, header compression and decompression, sequence numbering and re-sequencing, and de-duplication. RLC functions comprise ARQ, sequence numbering and resequencing, and segmentation and resegmentation. MAC functions comprise buffer status, power control, channel quality, HARQ, user identification, random access, user scheduling, and QoS. PHY functions comprise packet formation/deformation, windowing/de-windowing, guard-insertion/guard-deletion, parsing/de-parsing, control insertion/removal, interleaving/de-interleaving, FEC encoding/decoding, rate matching/dematching, scrambling/descrambling, modulation mapping/de-mapping, channel estimation/equalization, FFTs/IFFTs, channel coding/decoding, layer mapping/de-mapping, precoding, DFTs/IDFTs, and RE mapping/de-mapping.

To control the DL 5GNR MIMO layers for UE 411, 5GNR radio 601 first exchanges 5GNR data with various UEs that are not shown for clarity. 5GNR radio 601 exchanges the 5GNR data with 5GNR BBU 602 over the CPRI links. 5GNR BBU 602 exchanges the 5GNR data with UPF 437 over the backhaul links. The 5GNR SDAP in 5GNR BBU 602 determines the average 5GNR DL data throughput over the backhaul links for these UEs. The 5GNR SDAP indicates the average 5GNR DL data throughput to the 5GNR MAC.

Contemporaneously, 5GNR UE 411 wirelessly attaches to 5GNR radio 601. The 5GNR MAC in 5GNR BBU 602 selects a number of DL 5GNR MIMO layers for UE 411 based on the average 5GNR DL data throughput. The 5GNR MAC signals the selected number of DL 5GNR MIMO layers to the 5GNR MAC in UE 411 and to the 5GNR RRC and PHY in BBU 602. The 5GNR RRC transfers the selected number of DL 5GNR MIMO layers to AMF 437. AMF 437 directs UPF 437 (through SMF 438) to serve 5GNR UE 411 over 5GNR BBU 602.

UPF 437 exchanges 5GNR data with the 5GNR SDAP in 5GNR BBU 602. The 5GNR SDAP in BBU 602 exchanges the 5GNR data with the 5GNR SDAP in UE 411 over the PDCPs, RLCs, MACs, and PHYs. The 5GNR PHYs precode and map the DL 5GNR data to the selected DL MIMO layers responsive to 5GNR MAC control. The number of UL 5GNR MIMO layers may be controlled in a similar manner to the number of DL 5GNR MIMO layers. The number of UL MIMO layers could be based on the UL throughput, DL throughput, or some other backhaul quality metric.

Figure 7:
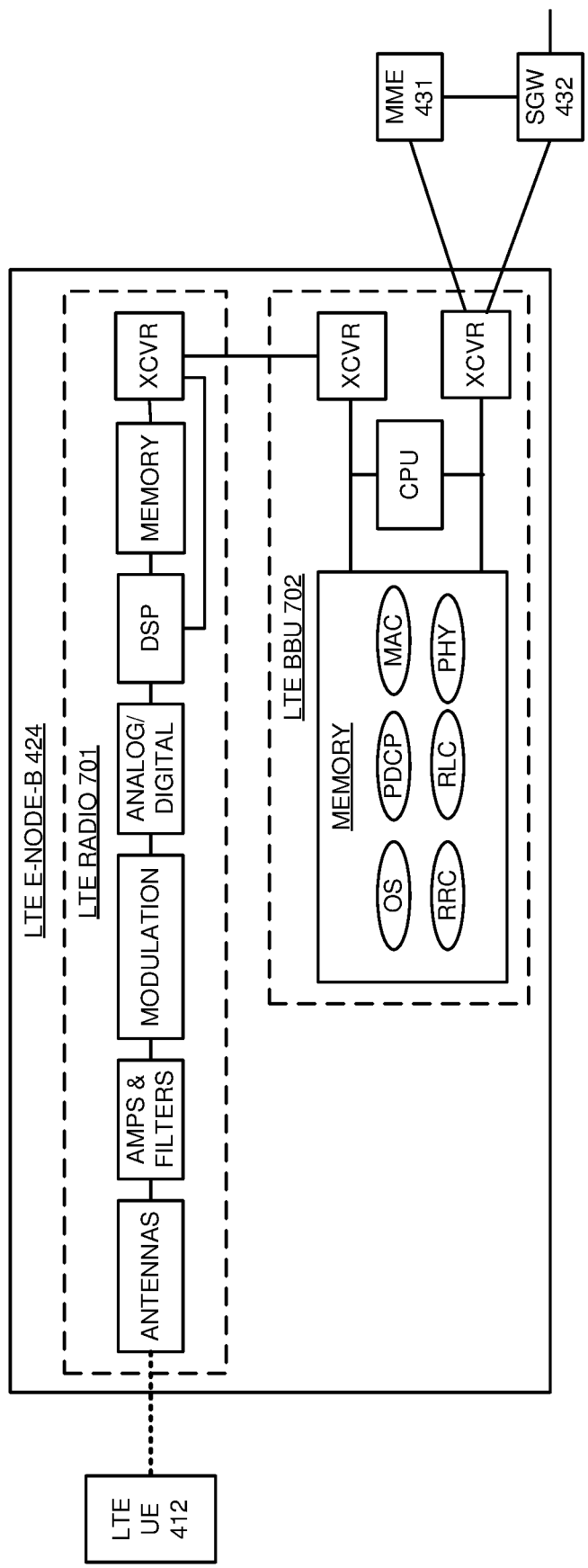
FIG. 7 illustrates an LTE eNodeB to serve UEs over the MIMO layers based on the backhaul link quality.

FIG. 7 illustrates LTE eNodeB 424 to serve LTE UE 412 over LTE MIMO layers based on the backhaul link quality. LTE eNodeB 424 comprises LTE radio 701 and LTE BBU 702. LTE radio 701 comprises antennas, amplifiers, filters, modulation, analog-to-digital interfaces, DSP, memory, and transceivers that are coupled over bus circuitry. BBU 702 comprises memory, CPU, and transceivers that are coupled over bus circuitry. The memory in BBU 702 stores operating systems and network applications like PHY, MAC, RLC, PDCP, and RRC. The CPU in BBU 702 executes the operating systems, PHYs, MACs, RLCs, PDCPs, and RRCs to exchange network signaling with LTE UE 412 and MME 431 and to exchange user data between LTE UE 412 and SGW 432. LTE UE 412 is wirelessly coupled to the antennas in LTE radio 701 over an LTE link. The transceiver in LTE radio 701 is coupled to a transceiver in LTE BBU 702 over CPRI links. A transceiver in LTE BBU 702 is coupled to MME 431 and SGW 432 over backhaul links.

In LTE radio 701, the antennas receive wireless LTE signals from LTE UE 412 that transport UL LTE signaling and UL LTE data. The antennas transfer corresponding electrical UL signals through duplexers to the amplifiers. The amplifiers boost the received UL signals for filters which attenuate unwanted energy. Demodulators down-convert the UL signals from their carrier frequency. The analog/digital interfaces convert the analog UL signals into digital UL signals for the DSP. The DSP recovers UL LTE symbols from the UL digital signals. The CPUs execute the network applications to process the UL LTE symbols and recover the UL LTE signaling and the UL LTE data. The LTE RRC processes the UL LTE signaling and DL S1-MME signaling from MME 431 to generate new UL S1-MME signaling and new DL LTE signaling. The LTE RRC transfers the new UL S1-MME signaling to MME 431. The LTE PDCP transfers the UL LTE data to SGW 432 over backhaul links.

In LTE BBU 702, the LTE RRC receives the DL S1-MME signaling from MME 431. The LTE PDCP receives DL LTE data from SGW 432. The LTE network applications process the new DL LTE signaling and the DL LTE data to generate corresponding DL LTE symbols that carry the DL LTE signaling and DL LTE data. In LTE radio 701, the DSP processes the DL LTE symbols to generate corresponding digital signals for the analog-to-digital interfaces. The analog-to-digital interfaces convert the digital DL signals into analog DL signals for modulation. Modulation up-converts the DL signals to their carrier frequency. The amplifiers boost the modulated DL signals for the filters which attenuate unwanted out-of-band energy. The filters transfer the filtered DL signals through duplexers to the antennas. The electrical DL signals drive the antennas to emit corresponding wireless LTE signals that transport the DL LTE signaling and DL LTE data to LTE UE 412.

RRC functions comprise authentication, security, handover control, status reporting, QoS, network broadcasts and pages, and network selection. PDCP functions comprise LTE/5GNR allocations, security ciphering, header compression and decompression, sequence numbering and re-sequencing, and de-duplication. RLC functions comprise ARQ, sequence numbering and resequencing, and segmentation and resegmentation. MAC functions comprise buffer status, power control, channel quality, HARQ, user identification, random access, user scheduling, and QoS. PHY functions comprise packet formation/deformation, windowing/de-windowing, guard-insertion/guard-deletion, parsing/de-parsing, control insertion/removal, interleaving/de-interleaving, FEC encoding/decoding, rate matching/dematching, scrambling/descrambling, modulation mapping/de-mapping, channel estimation/equalization, FFTs/IFFTs, channel coding/decoding, layer mapping/de-mapping, precoding, DFTs/IDFTs, and RE mapping/de-mapping.

LTE radio 701 exchanges LTE data with various UEs that are not shown for clarity. LTE radio 701 exchanges the LTE data with LTE BBU 702 over the CPRI links. LTE BBU 702 exchanges the LTE data with SGW 432 over backhaul links. The LTE PDCP in LTE BBU 702 determines the average LTE DL data throughput over the backhaul links for the UEs. The LTE PDCP indicates the average LTE DL data throughput to the LTE MAC. Contemporaneously, LTE UE 412 wirelessly attaches to LTE radio 701. The LTE MAC in LTE BBU 702 selects a number of DL LTE MIMO layers for UE 412 based on the average LTE DL data throughput. The LTE MAC signals the selected number of DL LTE MIMO layers to the LTE MAC in UE 412 and to the LTE RRC and PHY in BBU 702. The LTE RRC transfers the selected number of DL LTE MIMO layers to MME 431, and MME 431 directs SGW 432 to serve LTE UE 412 over LTE BBU 702. SGW 432 exchanges LTE data with the LTE PDCP in LTE BBU 702. The LTE PDCP in BBU 702 exchanges the LTE data with the LTE PDCP in UE 412 over the RLCs, MACs, and PHYs. The LTE PHYs pre-code and map the DL LTE data to the selected DL MIMO layers responsive to LTE MAC control. The number of UL LTE MIMO layers may be controlled in a similar manner to the number of DL LTE MIMO layers. The number of UL MIMO layers could be based on the UL throughput, DL throughput, or some other backhaul quality metric.

Figure 8:
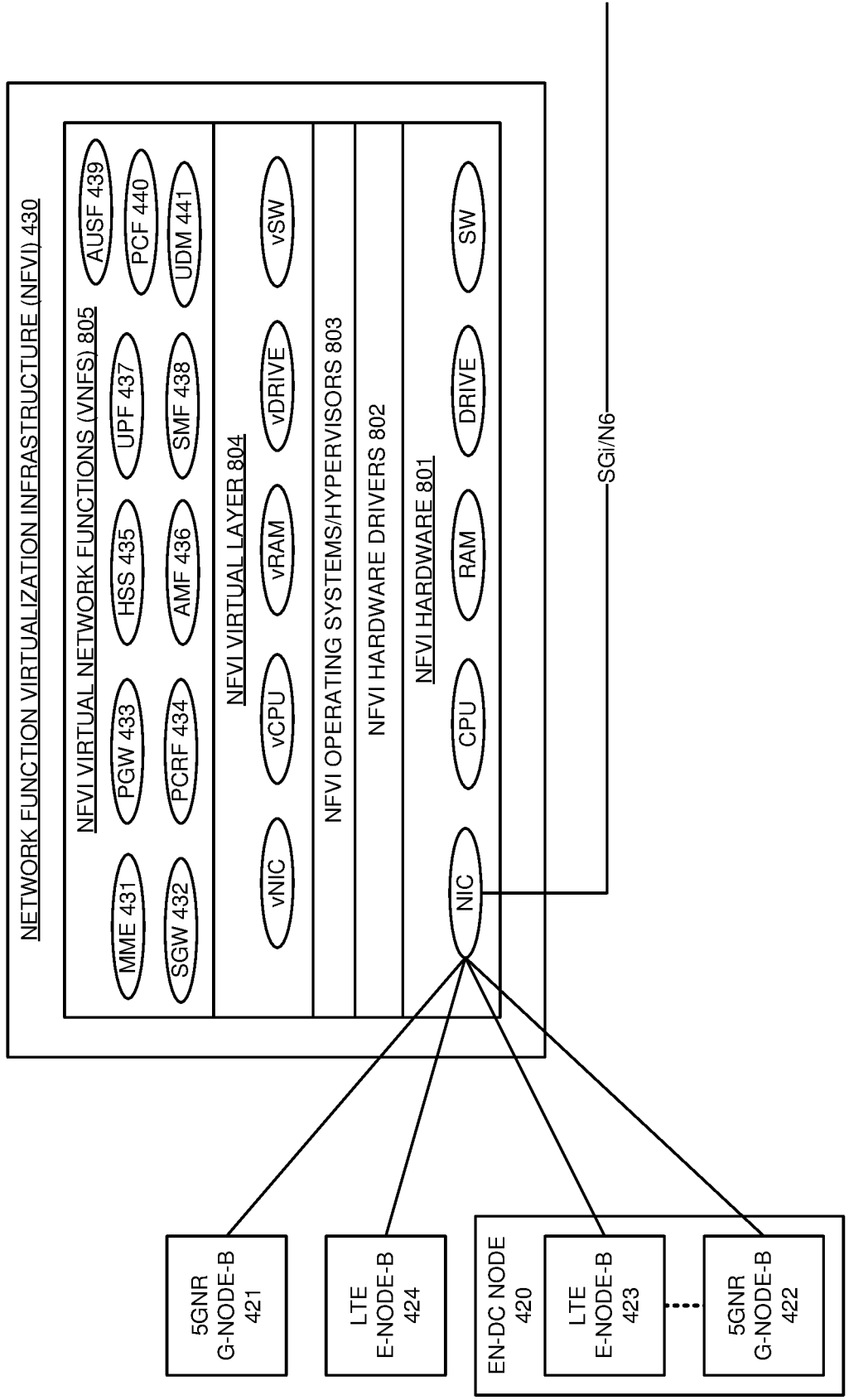
FIG. 8 illustrates a Network Function Virtualization Infrastructure (NFVI) to serve UEs over the MIMO layers based on the backhaul link quality.

FIG. 8 illustrates Network Function Virtualization Infrastructure (NFVI) 430 to serve UEs 410-412 over the 5GNR and LTE MIMO layers based on the backhaul link quality. NFVI 430 is an example of network elements 130, although network elements 130 may differ. NFVI 430 comprises NFVI hardware 801, NFVI hardware drivers 802, NFVI operating systems and hypervisors 803, NFVI virtual layer 804, and NFVI Virtual Network Functions (VNFs) 805. NFVI hardware 801 comprises Network Interface Cards (NIC), CPU, RAM, flash/disk drives, and data switches (SWS). NFVI virtual layer 804 comprises virtual NICs (vNIC), virtual CPUs (vCPU), virtual RAM (vRAM), virtual Drives (vDRIVE), and virtual Switches (vSW). The NIC are coupled to NodeBs 421-424 over backhaul links. The NIC are coupled to external systems over SGi and N6 links. NFVI VNFs 805 comprise MME 431, SGW 432, PGW 433, PCRF 434, HSS 435, AMF 436, UPF 437, SMF 438, AUSF 439, PCF 440, and UDM 441. Other LTE and 5GC VNFs are typically present but are omitted for clarity. NFVI hardware 801 executes NFVI hardware drivers 802, NFVI operating systems and hypervisors 803, NFVI virtual layer 804, and NFVI VNFs 805 to serve UEs with the data service over NodeBs 421-424 using selected numbers of MIMO layers based on backhaul quality.

SGW 432 exchanges user data with NodeBs 422-424 over the backhaul links. MME 431 receives S1-MME signaling from LTE eNodeBs 423-424 that request data services for UE 410 and UE 412 from LTE eNode Bs 423-424. MME 431 interacts with HSS 435 to authenticate and authorize UE 410 and UE 412 for wireless data services that are represented by APNs—and that include 5GNR service for UE 410. MME 431 transfers the APNs for UE 410 and UE 412 to PGW 433 over SGW 432. PGW 433 interacts with PCRF 434 to select QCIs and network addresses for UE 410 and UE 412 based on the APNs. PGW 433 transfers the APNs, QCIs, and addresses to MME 431 over SGW 432. MME 431 transfers the APNs, QCIs, and network addresses for UE 410 and UE 412 to LTE eNodeBs 423-424. MME 431 receives S1-MME signaling from LTE eNodeBs 423-424 that indicate the selected number of downlink MIMO layers for UE 410 and UE 412. PGW 433 exchanges user data for UE 410 and UE 412 with external systems. LTE PGW 433 exchanges the user data with SGW 432 which exchanges the user data with LTE eNodeBs 423-424 and 5GNR gNodeB 422. In some examples, SGW 432 and PGW 433 are integrated together into a System Architecture Evolution Gateway (SAE GW) in NFVI 430.

UPF 437 exchanges user data 5GNR gNodeB 421 over the backhaul links. AMF 436 receives N2 signaling from 5GNR gNodeB 421 that requests data service for UE 411. AMF 436 interacts with SMF 438, AUSF 439, PCF 440, and UDM 441 to authenticate and authorize 5GNR UE 411 for 5GNR data services. AMF 436 transfers quality-of-service metrics and network addressing for 5GNR UE 411 to 5GNR gNodeB 421 and SMF 438. SMF 438 directs UPF 437 to serve UE 411 per the quality-of-service metrics and network addressing. AMF 437 receives N2 signaling from 5GNR gNodeB 421 that indicates the selected number of downlink 5GNR MIMO layers for 5GNR UE 411.

Figure 9:
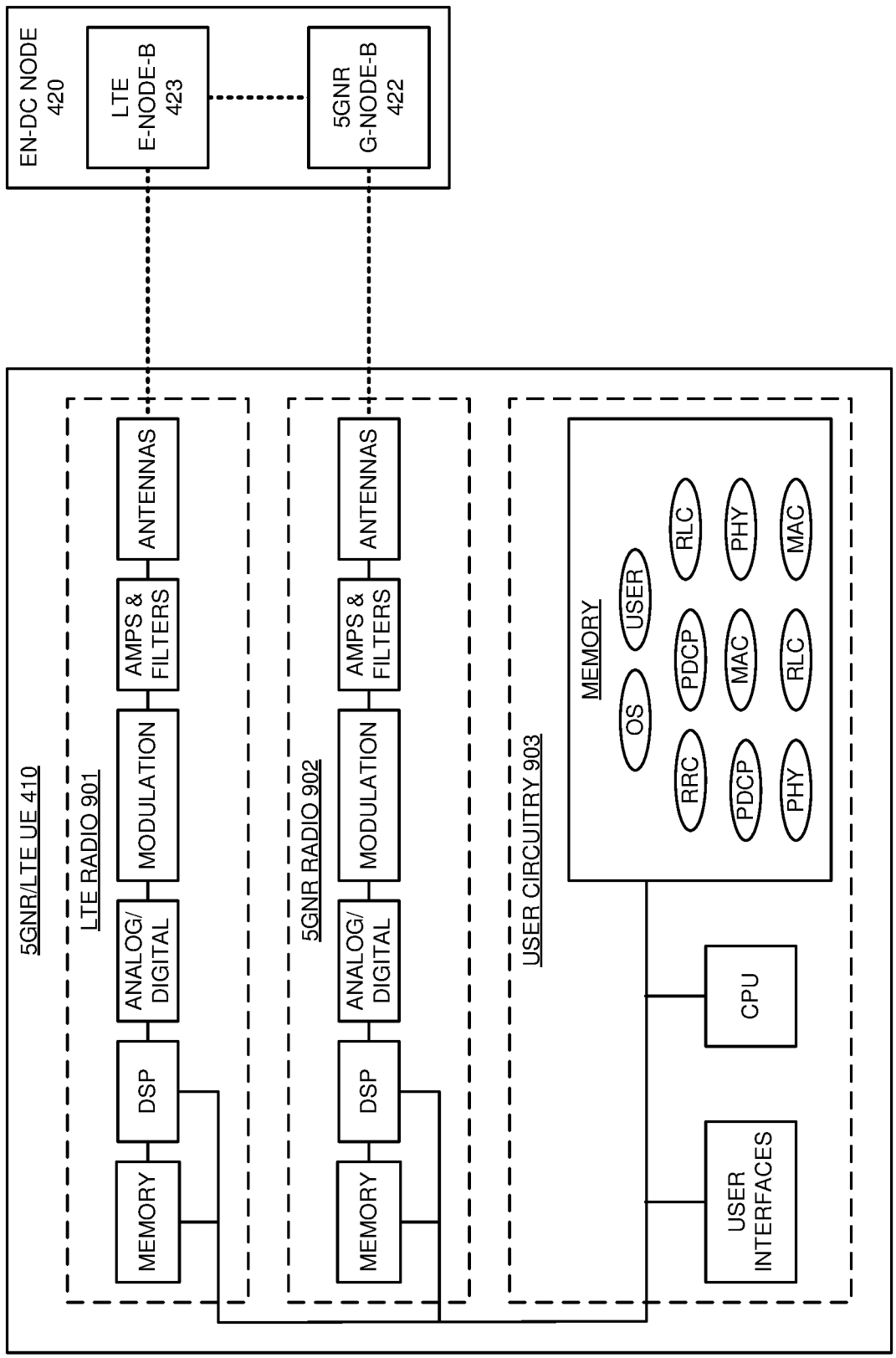
FIG. 9 illustrates a 5GNR/LTE UE that is served by an EN-DC access node over the MIMO layers based on the backhaul link quality.

FIG. 9 illustrates 5GNR/LTE UE 410 that is served by EN-DC access node 420 over the 5GNR and LTE MIMO layers based on the backhaul link quality. 5GNR/LTE UE 410 is an example of UEs 101-102, although UEs 101-102 may differ. UE 410 comprises LTE radio 901, 5GNR radio 902, and user circuitry 903 that are coupled over bus circuitry. Radios 901-902 comprise antennas, amplifiers, filters, modulation, analog-to-digital interfaces, DSP, and memory that are coupled over bus circuitry. User circuitry 903 comprises user interfaces, CPU, and memory that are coupled over bus circuitry. The antennas in radios 901-902 are wirelessly coupled to NodeBs 422-423 on EN-DC node 420. The user interfaces in user circuitry 903 comprise graphic displays, machine controllers, sensors, cameras, transceivers, and/or some other user components. The memory in user circuitry 903 stores an operating system, user applications (USER), and network applications (PHY, MAC, RLC, PDCP, and RRC). The CPU in user circuitry 903 executes the operating system and the user applications to generate and consume user data. The CPU in user circuitry 903 executes the operating system and the network applications to wirelessly exchange corresponding signaling and data with NodeBs 422-423 over radios 901-902.

The LTE MAC in UE 410 receives LTE MAC signaling from the LTE MAC in LTE eNodeB 423 that indicates the selected number of DL LTE MIMO layers. The LTE MAC directs the LTE PHY to receive LTE data from the LTE PHY in LTE eNodeB 423 over the selected number of DL LTE MIMO layers. The LTE PHY demaps and decodes the LTE data from the selected number of DL LTE MIMO layers.

The 5GNR MAC in UE 410 receives 5GNR MAC signaling from the 5GNR MAC in 5GNR gNodeB 422 that indicates the selected number of DL 5GNR MIMO layers. The 5GNR MAC directs the 5GNR PHY to receive 5GNR data from the 5GNR PHY in 5GNR gNodeB 422 over the selected number of DL 5GNR MIMO layers. The 5GNR PHY demaps and decodes the 5GNR data from the selected number of DL 5GNR MIMO layers.

Figure 10:
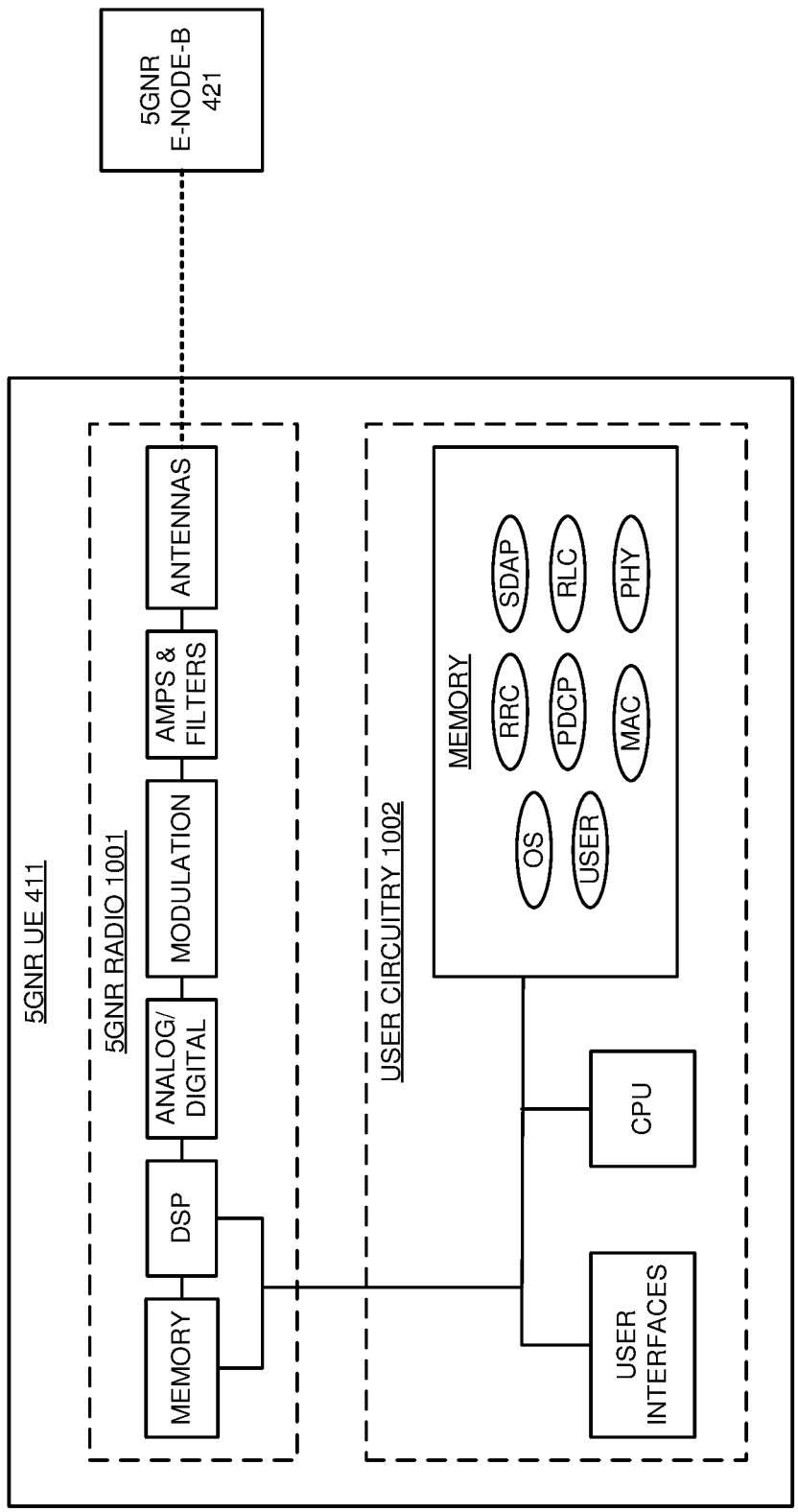
FIG. 10 illustrates 5GNR UE 411 that is served by a 5GNR gNodeB over the MIMO layers based on the backhaul link quality.

FIG. 10 illustrates 5GNR UE 411 that is served by 5GNR gNodeB 421 over the MIMO layers based on the backhaul link quality. 5GNR UE 411 is an example of UEs 101-102, although UEs 101-102 may differ. UE 411 comprises 5GNR radio 1001 and user circuitry 1002 that are coupled over bus circuitry. 5GNR radios 1001 comprises antennas, amplifiers, filters, modulation, analog-to-digital interfaces, DSP, and memory that are coupled over bus circuitry. User circuitry 1002 comprises user interfaces, CPU, and memory that are coupled over bus circuitry. The antennas in 5GNR radio 1001 are wirelessly coupled to 5GNR gNodeB 421. The user interfaces in user circuitry 1002 comprise graphic displays, machine controllers, sensors, cameras, transceivers, and/or some other user components. The memory in user circuitry 1002 stores an operating system, user applications, and network applications (PHY, MAC, RLC, PDCP, SDAP, and RRC). The CPU in user circuitry 1002 executes the operating system and the user applications to generate and consume user data. The CPU in user circuitry 1002 executes the operating system and the network applications to wirelessly exchange corresponding signaling and data with 5GNR gNodeB 421 over 5GNR radio 1001. The 5GNR MAC in UE 411 receives 5GNR MAC signaling from the 5GNR MAC in 5GNR gNodeB 421 that indicates the selected number of DL 5GNR MIMO layers. The 5GNR MAC directs the 5GNR PHY to receive 5GNR data from the 5GNR PHY in 5GNR gNodeB 421 over the selected number of DL 5GNR MIMO layers. The 5GNR PHY demaps and decodes the 5GNR data from the selected number of DL 5GNR MIMO layers.

Figure 11:
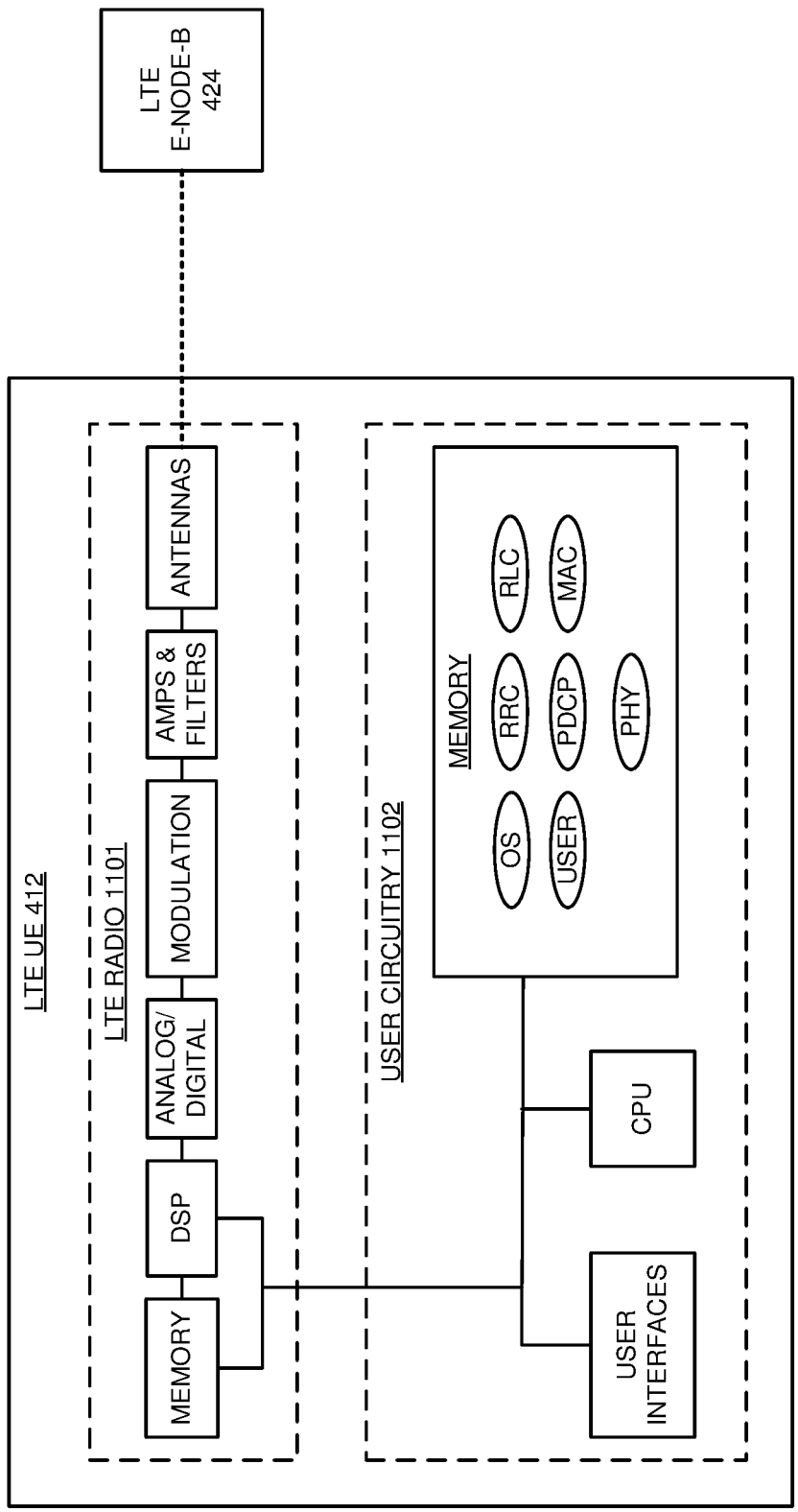
FIG. 11 illustrates LTE UE 412 that is served by an LTE eNodeB over the MIMO layers based on the backhaul link quality.

FIG. 11 illustrates LTE UE 412 that is served by LTE eNodeB 424 over the MIMO layers based on the backhaul link quality. LTE UE 412 is an example of UEs 101-102, although UEs 101-102 may differ. UE 412 comprises LTE radio 1101 and user circuitry 1102 that are coupled over bus circuitry. LTE radios 1101 comprises antennas, amplifiers, filters, modulation, analog-to-digital interfaces, DSP, and memory that are coupled over bus circuitry. User circuitry 1102 comprises user interfaces, CPU, and memory that are coupled over bus circuitry. The antennas in LTE radio 1101 is wirelessly coupled to LTE eNodeB 424. The user interfaces in user circuitry 1102 comprise graphic displays, machine controllers, sensors, cameras, transceivers, and/or some other user components. The memory in user circuitry 1102 stores an operating system, user applications and network applications (PHY, MAC, RLC, PDCP, and RRC). The CPU in user circuitry 1102 executes the operating system and the user applications to generate and consume user data. The CPU in user circuitry 1102 executes the operating system and the network applications to wirelessly exchange corresponding signaling and data with LTE eNodeB 424 over LTE radios 1101. The LTE MAC in UE 412 receives LTE MAC signaling from the LTE MAC in LTE eNodeB 424 that indicates the selected number of DL LTE MIMO layers. The LTE MAC directs the LTE PHY to receive LTE data from the LTE PHY in LTE eNodeB 424 over the selected number of DL LTE MIMO layers. The LTE PHY demaps and decodes the LTE data from the selected number of DL LTE MIMO layers.

Figure 12:
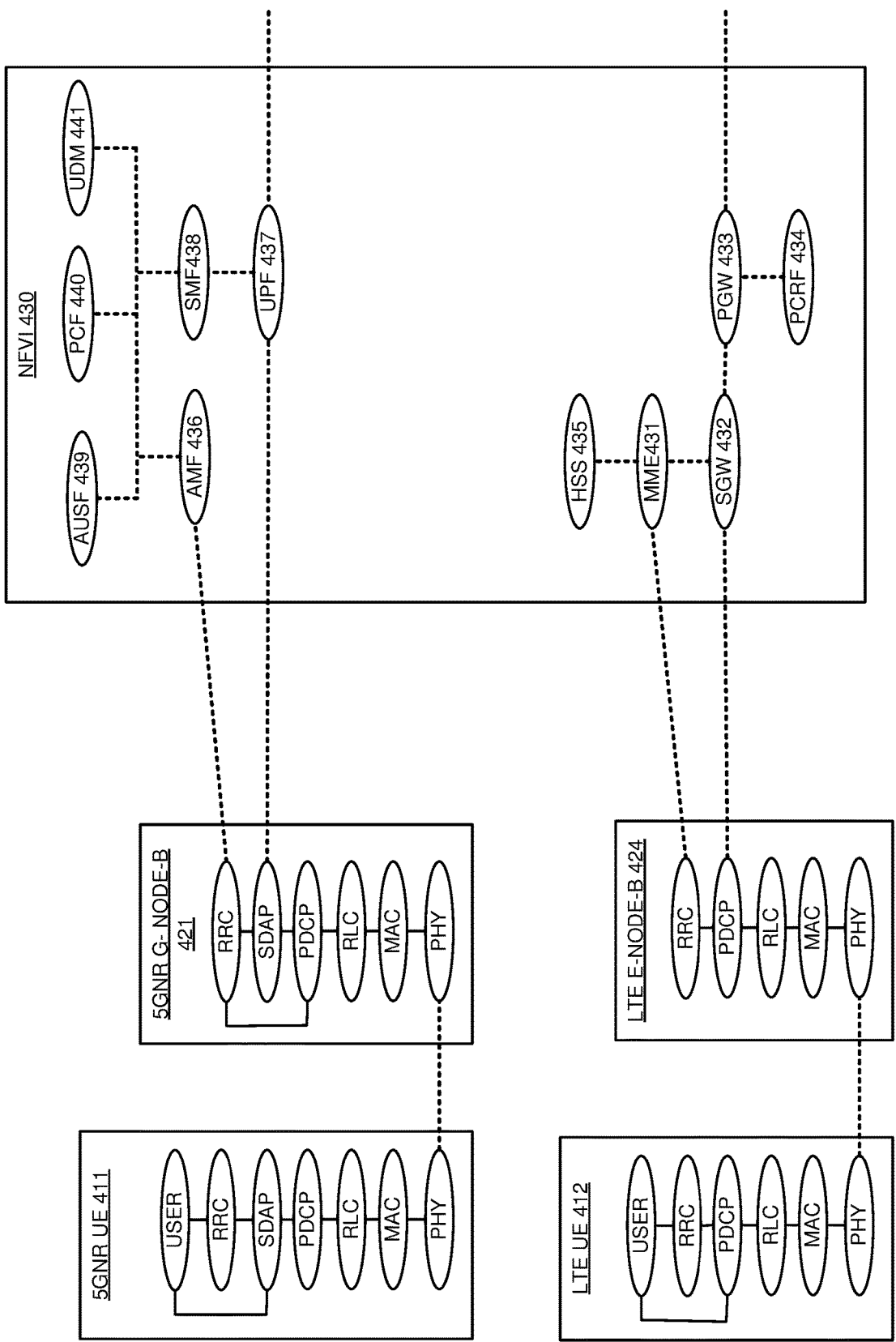
FIG. 12 illustrates an exemplary operation of the UEs, 5GNR gNodeB, LTE eNodeB, and NFVI to serve the UEs over the MIMO layers based on the backhaul link quality.

FIG. 12 illustrates an exemplary operation of UEs 411-412, 5GNR gNodeB 421, LTE eNodeB 424, and NFVI 430 to serve UEs 411-412 over MIMO layers based on backhaul link quality. The 5GNR SDAP in 5GNR gNodeB 421 and UPF 437 in NFVI 430 exchange user data over backhaul links (for UEs that are not shown). The 5GNR SDAP determines the DL throughput over the backhaul links in average bits per second and signals the DL throughput to the 5GNR MAC. In 5GNR UE 411, a user application requests data communication, and the 5GNR RRC attaches to the 5GNR RRC in 5GNR gNodeB 421 over the 5GNR PDCPs, RLCs, MACs, and PHYs. The 5GNR RRC in 5GNR gNodeB 421 requests data services for 5GNR UE 411 in N2 signaling to AMF 436 over the backhaul links.

AMF 436 interacts with SMF 438, AUSF 439, PCF 440, UDM 441, and typically other functions to authenticate and authorize 5GNR UE 411 for 5GNR data services. SMF 438 directs UPF 437 to serve UE 411 per the quality-of-service metrics and network addressing. AMF 436 transfers quality-of-service metrics and network addressing for UE 411 to the RRC in 5GNR gNodeB 421 in N2 signaling. The RRC in 5GNR gNodeB 421 transfers the quality-of-service metrics and network addressing to the RRC in UE 411 over the PDCPs, RLCs, MACs, and PHYs.

The 5GNR MAC in 5GNR gNodeB 421 selects a number of 5GNR DL MIMO layers based on the DL throughput over the backhaul links measured by the 5GNR SDAP. The 5GNR MAC signals the selected number of MIMO layers to the 5GNR MAC in 5GNR UE 411 over the PHYs. The 5GNR MAC signals the selected number of MIMO layers to the 5GNR RRC in 5GNR UE 411 over the RLC and PDCP. The 5GNR RRC indicates the selected number of MIMO layers for UE 411 to AMF 436 in N2 signaling over the backhaul links.

UPF 437 exchanges user data for UE 411 with external systems. UPF 437 exchanges the user data with the SDAP in 5GNR gNodeB 421. The SDAP in 5GNR gNodeB 421 exchanges the user data with the SDAP in 5GNR UE 411 over the PDCPs, RLCs, MACs, and PHYs. The 5GNR PHYs in 5GNR gNodeB 421 apply precoding and layer mapping to transfer the DL user data over the number of DL MIMO layers that was selected by the 5GNR MAC. The 5GNR SDAP in UE 411 exchanges the DL user data with the user applications.

The LTE PDCP in LTE eNodeB 424 and SGW 432 in NFVI 430 exchange user data over backhaul links (for UEs that are not shown). The LTE PDCP determines the DL throughput over the backhaul links in average bits per second and signals the DL throughput to the LTE MAC. In LTE UE 412, a user application requests data communication, and the LTE RRC attaches to the LTE RRC in LTE eNodeB 424 over the LTE PDCPs, RLCs, MACs, and PHYs. The LTE RRC in LTE eNodeB 424 requests data services for LTE UE 412 in S1-MME signaling to MME 431 over the backhaul links.

MME 431 interacts with HSS 435 to authenticate and authorize UE 412 for wireless data services by APNs. MME 431 transfers the APNs for UE 412 to PGW 433 over SGW 432. PGW 433 interacts with PCRF 434 to select QCIs and network addresses for UE 412 based on the APNs. PGW 433 transfers the APNs, QCIs, and addresses to MME 431 over SGW 432. MME 431 transfers the APNs, QCIs, and network address for UE 412 to the RRC in LTE eNodeB 424. The RRC in LTE eNodeB 424 transfers the APNs, QCIs, and network address to the RRC in UE 412 over the PDCPs, RLCs, MACs, and PHYs.

The LTE MAC in LTE eNodeB 424 selects a number of LTE DL MIMO layers based on the DL throughput over the backhaul links measured by the LTE PDCP. The LTE MAC signals the selected number of MIMO layers to the LTE MAC in LTE UE 412 over the PHYs. The LTE MAC signals the selected number of MIMO layers to the LTE RRC over the RLC and PDCP. The LTE RRC indicates the selected number of MIMO layers for UE 412 to MME 431 in S1-MME signaling over the backhaul links.

PGW 433 exchanges user data for UE 412 with external systems. PGW 433 exchanges the user data with SGW 432 which exchanges the user data with the PDCP in LTE eNodeB 424. The PDCP in LTE eNodeB 424 exchanges the user data with the PDCP in UE 412. The LTE PHYs in LTE eNodeB 424 apply precoding and layer mapping to transfer the DL user data over the number of DL MIMO layers that was selected by the LTE MAC. The LTE PDCP in UE 411 exchanges the DL user data with the user applications. In some examples, SGW 432 and PGW 433 are integrated together into an SAE GW in NFVI 430.

Figure 13:
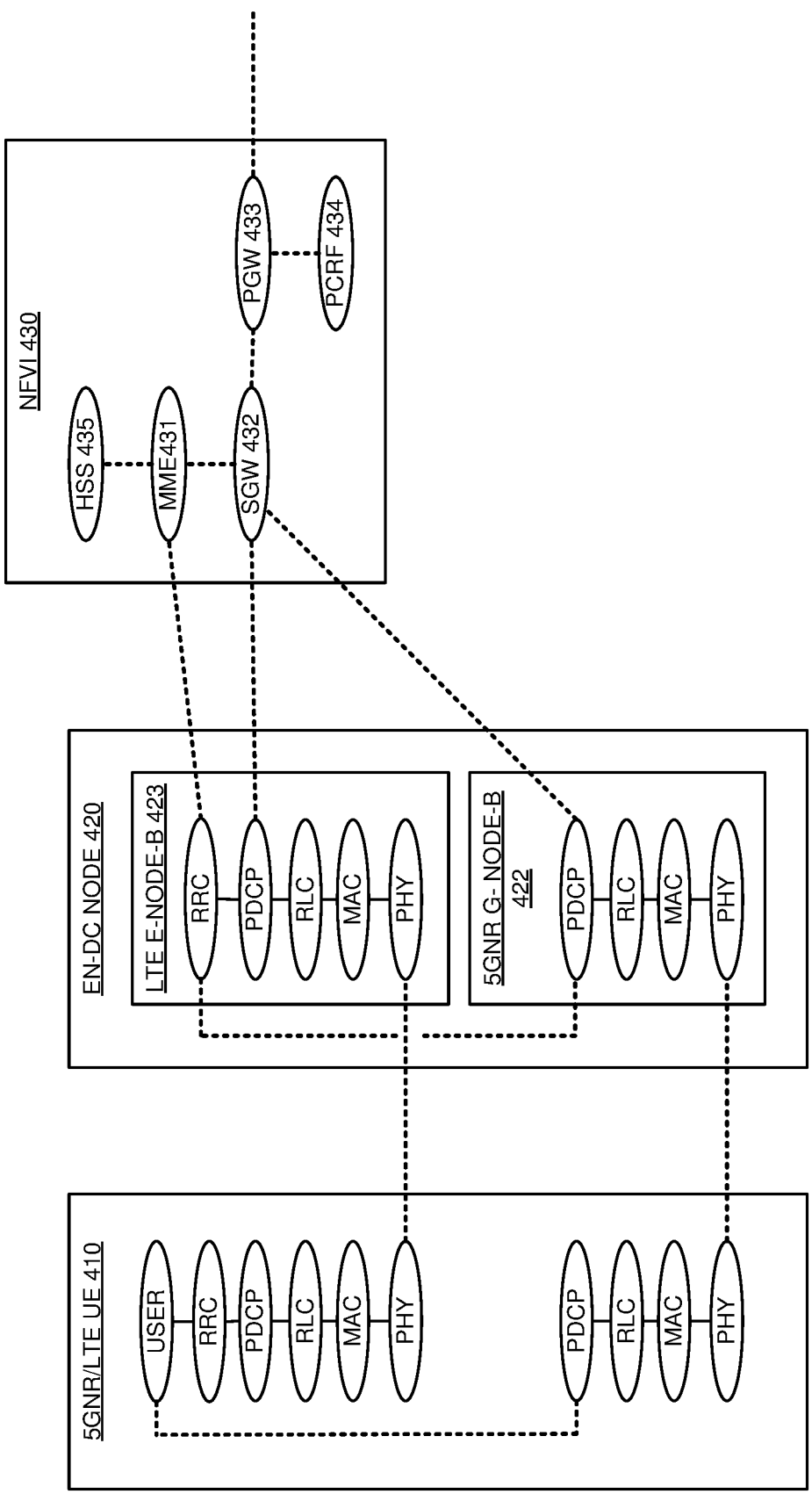
FIG. 13 illustrates an exemplary operation of the UEs, EN-DC access node, and NFVI to serve the 5GNR/LTE UE over the MIMO layers based on the backhaul link quality.

FIG. 13 illustrates an exemplary operation of 5GNR/LTE UE 410, EN-DC access node 420, and NFVI 430 to serve 5GNR/LTE UE 410 over the MIMO layers based on the backhaul link quality. The LTE PDCP in LTE eNodeB 423 and SGW 432 in NFVI 430 exchange user data over backhaul links (for UEs that are not shown). The LTE PDCP determines the DL throughput over the backhaul links in average bits per second and signals the DL throughput to the LTE MAC. The 5GNR PDCP in 5GNR gNodeB 422 and SGW 432 in NFVI 430 exchange user data over backhaul links (for UEs that are not shown). The 5GNR PDCP determines the DL throughput over the backhaul links in average bits per second. The 5GNR PDCP and signals the DL throughput to the 5GNR MAC.

In 5GNR/LTE UE 410, a user application requests data communication, and the LTE RRC in UE 410 attaches to the LTE RRC in LTE eNodeB 423 over the LTE PDCPs, RLCs, MACs, and PHYs. The LTE RRC indicates 5GNR capability for UE 410 to the LTE RRC in LTE eNodeB 423. The LTE RRC in LTE eNodeB 423 transfers S1-MME signaling to MME 431 that requests data services and indicates the 5GNR capability for LTE UE 410.

MME 431 interacts with HSS 435 to authenticate and authorize UE 410 for wireless data services by APNs—including 5GNR service. MME 431 transfers the APNs for UE 410 to PGW 433 over SGW 432. PGW 433 interacts with PCRF 434 to select QCIs and network addresses for UE 410 based on the APNs. PGW 433 transfers the APNs, QCIs, and addresses to MME 431 over SGW 432. MME 431 transfers the APNs, QCIs, and network address for UE 410 to the RRC in LTE eNodeB 423. The RRC in LTE eNodeB 423 transfers the APNs, QCIs, and network address to the LTE RRC in UE 410 over the PDCPs, RLCs, MACs, and PHYs.

The LTE MAC in LTE eNodeB 423 selects a number of LTE DL MIMO layers based on the DL throughput over the backhaul links measured by the LTE PDCP. The LTE MAC signals the selected number of MIMO layers to the LTE MAC in LTE UE 410 over the PHYs. The LTE MAC signals the selected number of MIMO layers to the LTE RRC over the RLC and PDCP. The LTE RRC indicates the selected number of MIMO layers for UE 410 to MME 431 in S1-MME signaling over the backhaul links.

PGW 433 exchanges the user data with SGW 432 which exchanges the user data with the PDCP in LTE eNodeB 423. The PDCP in LTE eNodeB 423 exchanges the user data with the LTE PDCP in UE 410 over the RLCs, MACs, and PHYs. The LTE PHYs in LTE eNodeB 423 apply precoding and layer mapping to transfer the DL user data over the number of DL MIMO layers that was selected by the LTE MAC. The LTE PDCP in UE 411 exchanges the DL user data with the user applications. In some examples, SGW 432 and PGW 433 are integrated together into an SAE GW in NFVI 430.

In response to the 5GNR service authorization, the LTE RRC in LTE eNodeB 423 directs the 5GNR PDCP in UE 410 to attach to 5GNR gNodeB 422 in EN-DC node 420. The 5GNR PDCP attaches to the 5GNR PDCP in 5GNR gNodeB 422 over the 5GNR RLCs, MACs, and PHYs. The 5GNR PDCP in 5GNR gNodeB 422 requests 5GNR service for UE 410 from the LTE RRC in LTE eNodeB 423 over X2 signaling. The LTE RRC in LTE eNodeB 423 requests the 5GNR service for UE 410 from MME 431 over S1-MME signaling. MME 431 directs SGW 432 to serve UE 410 over 5GNR gNodeB 422. MME 431 transfers the APNs, QCIs, and network address for UE 410 to the RRC in LTE eNodeB 423. The RRC in LTE eNodeB 423 transfers the APNs, QCIs, and network address to the 5GNR PDCP in 5GNR gNodeB 422 over X2 signaling. The 5GNR PDCP in 5GNR gNodeB 422 in UE 410 transfers the APNs, QCIs, and network address to the 5GNR PDCP in UE 410 over the RLCs, MACs, and PHYs.

The 5GNR MAC in 5GNR gNodeB 422 selects a number of 5GNR DL MIMO layers based on the DL throughput over the backhaul links measured by the 5GNR PDCP. The 5GNR MAC signals the selected number of MIMO layers to the 5GNR MAC in 5GNR UE 410 over the PHYs. The 5GNR MAC signals the selected number of MIMO layers to the LTE RRC in LTE eNodeB 423. The LTE RRC indicates the selected number of MIMO layers for UE 410 to MME 431 in S1-MME signaling over the backhaul links.

SGW 432 exchanges user data for UE 410 with external systems. SGW 432 exchanges the user data with the PDCP in 5GNR gNodeB 422. The PDCP in 5GNR gNodeB 422 exchanges the user data with the PDCP in 5GNR UE 411 over the RLCs, MACs, and PHYs. The 5GNR PHYs in 5GNR gNodeB 422 apply precoding and layer mapping to transfer the DL user data over the number of DL MIMO layers that was selected by the 5GNR MAC. The 5GNR PDCP in UE 410 exchanges the DL user data with the user applications.

When the backhaul links become congested and data throughput suffers, the LTE MAC in LTE eNodeB 423 starts to reduce the number of LTE MIMO layers for the UEs that it serves to mitigate the backhaul congestion. The 5GNR MAC awaits instructions from the LTE MAC. After the LTE MAC has finished the LTE MIMO layer reductions and with backhaul quality still suffering, the LTE MAC signals the 5GNR MAC to begin 5GNR MIMO layer reductions. The 5GNR MAC in 5GNR gNodeB 422 then starts to reduce the number of 5GNR MIMO layers for the UEs that it serves to mitigate the backhaul congestion. When the backhaul links heal and data throughput improves, the 5GNR MAC in 5GNR gNodeB 422 starts to increase the number of 5GNR MIMO layers for the UEs that it serves to improve data service quality. The LTE MAC now awaits instructions from the 5GNR MAC. After the 5GNR MAC has finished the 5GNR MIMO layer increases and with backhaul quality still improving, the 5GNR MAC signals the LTE MAC to begin LTE MIMO layer increases. The LTE MAC in LTE eNodeB 423 then starts to increase the number of LTE MIMO layers for the UEs that it serves to improve data service quality.

The wireless data network circuitry described above comprises computer hardware and software that form special-purpose network circuitry to serve wireless UEs over multiple MIMO layers based on backhaul link quality. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose network circuitry to serve wireless UEs over multiple MIMO layers based on backhaul link quality.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless access node to serve a plurality of wireless User Equipment (UE) over Multiple Input Multiple Output (MIMO) layers, the method comprising:
    a wireless access node wirelessly exchanging user data with at least two of the wireless UE;
    the wireless access node exchanging the user data over one or more backhaul links and determining backhaul link quality for each of the one or more backhaul links;
    the wireless access node accepting the attachment of a different one of the plurality of wireless UE and selecting an amount of the MIMO layers for the different one of the wireless UE based on the backhaul link quality for each of the one or more backhaul links; and
    the wireless access node wirelessly exchanging new user data with the different one of the wireless UE over the selected amount of the MIMO layers.

2. The method of claim 1 wherein the wireless access node comprises a Fifth Generation New Radio (5GNR) access node.

3. The method of claim 1 wherein the wireless access node comprises a Long Term Evolution (LTE) access node.

4. The method of claim 1 wherein the wireless access node comprises one of a Fifth Generation New Radio (5GNR) node and a Long Term Evolution (LTE) node in an Evolved Universal Terrestrial Radio Access Network Dual Connectivity (EN-DC) access node.

5. The method of claim 1 wherein the wireless access node exchanging the user data over the one or more backhaul links comprises exchanging the user data over the one or more backhaul links with at least one of a Serving Gateway (SGW), System Architecture Evolution Gateway (SAE GW), and User Plane Function (UPF).

6. The method of claim 5 wherein the wireless access node exchanging the user data over the one or more backhaul link and determining the backhaul link quality for each of the one or more backhaul links comprises:
    the wireless access node executing a Packet Data Convergence Protocol (PDCP) and a Media Access Control (MAC);
    the PDCP exchanging the user data over the one or more backhaul link;
    the PDCP determining the backhaul link quality for each of the one or more backhaul links; and
    the PDCP indicating the backhaul link quality for each of the one or more backhaul links to the MAC.

7. The method of claim 6 wherein the wireless access node selecting the amount of the MIMO layers comprises the MAC selecting the amount of the MIMO layers based on the indicated backhaul link quality.

8. The method of claim 7 further comprising the wireless access node executing a Radio Resource Control (RRC) and the MAC indicating the selected amount of the MIMO layers to the RRC.

9. The method of claim 8 further comprising the RRC transferring network signaling to one of a Mobility Management Entity (MME) and Access and Mobility Management Function (AMF) that indicates the selected amount of the MIMO layers for the new one of the UEs.

10. The method of claim 6 wherein:
    the wireless access node executing the MAC comprises executing a Long Term Evolution (LTE) MAC;
    the MAC selecting the amount of the MIMO layers comprises the LTE MAC selecting an amount of LTE MIMO layers; and further comprising:
    the wireless access node executing a Fifth Generation New Radio (5GNR) MAC;
    the LTE MAC transferring MAC signaling to the 5GNR MAC; and
    the 5GNR MAC selecting an amount of 5GNR MIMO layers responsive to the MAC signaling.

11. A wireless access node to serve a plurality of wireless User Equipment (UE) over Multiple Input Multiple Output (MIMO) layers, the wireless access node comprising:
    a radio configured to wirelessly exchange user data with at least two of the wireless UE;
    a Baseband Unit (BBU) coupled to the radio and configured to exchange the user data over one or more backhaul links and determine backhaul link quality for each of the one or more backhaul links;
    the radio configured to accept the attachment of a different one of the plurality of wireless UE;
    the BBU configured to select an amount of the MIMO layers for the different one of the wireless UE based on the backhaul link quality for each of the one or more backhaul links; and
    the radio configured to wirelessly exchange new user data with the different one of the wireless UE over the selected amount of the MIMO layers.

12. The wireless access node of claim 11 wherein the wireless access node comprises a Fifth Generation New Radio (5GNR) access node.

13. The wireless access node of claim 11 wherein the wireless access node comprises a Long Term Evolution (LTE) access node.

14. The wireless access node of claim 11 wherein the wireless access node comprises one of a Fifth Generation New Radio (5GNR) node and a Long Term Evolution (LTE) node in an Evolved Universal Terrestrial Radio Access Network Dual Connectivity (EN-DC) access node.

15. The wireless access node of claim 11 wherein the BBU is configured to exchange the user data over the one or more backhaul links with at least one of a Serving Gateway (SGW), System Architecture Evolution Gateway (SAE GW), and User Plane Function (UPF).

16. The wireless access node of claim 15 wherein the BBU is configured to execute a Packet Data Convergence Protocol (PDCP) and a Media Access Control (MAC) and the PDCP is configured to exchange the user data over the one or more backhaul link, determine the backhaul link quality for each of the one or more backhaul links, and indicate the backhaul link quality to the MAC.

17. The wireless access node of claim 16 wherein the MAC in the BBU is configured to select the amount of the MIMO layers based on the indicated backhaul link quality.

18. The wireless access node of claim 17 wherein the BBU is configured to execute a Radio Resource Control (RRC) and the MAC is configured to indicate the selected amount of the MIMO layers to the RRC.

19. The wireless access node of claim 18 further comprising the RRC configured to transfer network signaling to one of a Mobility Management Entity (MME) and Access and Mobility Management Function (AMF) that indicates the selected amount of the MIMO layers for the new one of the UEs.

20. The wireless access node of claim 16 wherein:
the MAC comprises a Long Term Evolution (LTE) MAC and the amount of the MIMO layers comprises an amount of LTE MIMO layers;
the BBU is configured to execute a Fifth Generation New Radio (5GNR) MAC;
the LTE MAC is configured to transfer MAC signaling to the 5GNR MAC; and
the 5GNR MAC is configured to select an amount of 5GNR MIMO layers responsive to the MAC signaling.

* * * * *